(12) United States Patent
Burrows et al.

(10) Patent No.: US 11,118,442 B2
(45) Date of Patent: *Sep. 14, 2021

(54) BORING TOOL TRACKING FUNDAMENTALLY BASED ON DRILL STRING LENGTH, PITCH AND ROLL

(71) Applicant: Merlin Technology Inc., Kent, WA (US)

(72) Inventors: James W. Burrows, Seattle, WA (US); Guenter W. Brune, Bellevue, WA (US); John E. Mercer, Gig Harbor, WA (US)

(73) Assignee: Merlin Technology Inc., Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/988,671

(22) Filed: Aug. 9, 2020

(65) Prior Publication Data

US 2021/0002996 A1   Jan. 7, 2021

Related U.S. Application Data

(63) Continuation of application No. 16/370,702, filed on Mar. 29, 2019, now Pat. No. 10,738,588, which is a
(Continued)

(51) Int. Cl.
*E21B 44/00* (2006.01)
*E21B 7/04* (2006.01)
(Continued)

(52) U.S. Cl.
CPC ............... *E21B 44/00* (2013.01); *E21B 7/04* (2013.01); *E21B 7/046* (2013.01); *E21B 7/10* (2013.01);
(Continued)

(58) Field of Classification Search
CPC . E21B 44/00; E21B 7/10; E21B 7/046; E21B 47/0232; E21B 7/04; E21B 47/024;
(Continued)

(56) References Cited

U.S. PATENT DOCUMENTS 4,714,118 A   12/1987   Baker et al.
4,821,815 A   4/1989    Baker et al.
(Continued)

OTHER PUBLICATIONS

Brown et al, Introduction to Random Signals and Applied Kalman Filtering, 1997, John Wiley & Sons.

*Primary Examiner* — Tara Schimpf
*Assistant Examiner* — Manuel C Portocarrero
(74) *Attorney, Agent, or Firm* — Pritzkau Patent Group LLC

(57) ABSTRACT

A boring tool moves having a pitch orientation, a yaw orientation and a roll orientation and is steerable underground using the roll orientation. A maximum drill string curvature is established for steering. The boring tool is advanced over a path segment. An averaged roll characteristic is determined for movement of the boring tool along the path segment. A path segment pitch orientation is established based on at least one measured pitch orientation along the path segment. Using the maximum drill string curvature in combination with the averaged roll characteristic and the path segment pitch orientation, the yaw orientation is determined. The averaged roll characteristic is determined based on a series of incremental roll measurements that are spaced across the path segment. A set of coupled ordinary differential equations is used to characterize movement of the boring tool.

10 Claims, 10 Drawing Sheets

Related U.S. Application Data continuation of application No. 15/177,297, filed on Jun. 8, 2016, now Pat. No. 10,246,985, which is a continuation of application No. 14/097,180, filed on Dec. 4, 2013, now Pat. No. 9,371,725, which is a continuation of application No. 13/688,314, filed on Nov. 29, 2012, now Pat. No. 8,622,150, which is a continuation of application No. 13/422,690, filed on Mar. 16, 2012, now Pat. No. 8,342,262, which is a continuation of application No. 13/151,517, filed on Jun. 2, 2011, now Pat. No. 8,157,023, which is a continuation of application No. 12/780,421, filed on May 14, 2010, now Pat. No. 7,967,080, which is a continuation of application No. 12/325,182, filed on Nov. 29, 2008, now Pat. No. 7,743,848, which is a continuation of application No. 11/930,483, filed on Oct. 31, 2007, now Pat. No. 7,472,761, which is a continuation of application No. 11/609,786, filed on Dec. 12, 2006, now Pat. No. 7,306,053, which is a continuation of application No. 11/051,878, filed on Feb. 5, 2005, now Pat. No. 7,165,632, which is a continuation of application No. 10/341,922, filed on Jan. 13, 2003, now Pat. No. 6,868,921.

(51) Int. Cl.
*E21B 47/024* (2006.01)
*E21B 47/0232* (2012.01)
*E21B 7/10* (2006.01)
*G01V 3/08* (2006.01)
*G01V 3/38* (2006.01)

(52) U.S. Cl.
CPC ........ *E21B 47/024* (2013.01); *E21B 47/0232* (2020.05); *G01V 3/081* (2013.01); *G01V 3/38* (2013.01)

(58) Field of Classification Search
CPC ... E21B 7/26; E21B 7/18; E21B 47/02; E21B 7/06; E21B 23/12; G01V 3/38
See application file for complete search history.

(56) References Cited

U.S. PATENT DOCUMENTS

| | | |
|---|---|---|
| 4,896,733 A | 1/1990 | Baker et al. |
| 5,700,546 A | 12/1997 | Fujii et al. |
| 5,764,062 A | 6/1998 | Mercer |
| 6,035,951 A | 3/2000 | Mercer |
| 6,063,244 A | 5/2000 | Pinarbasi |
| 6,223,826 B1 | 5/2001 | Chau et al. |
| 6,400,159 B1 | 6/2002 | Zeller et al. |
| 6,446,728 B2 | 9/2002 | Chau et al. |
| 6,470,976 B2 | 10/2002 | Alft et al. |
| 6,668,944 B2 | 12/2003 | Brune et al. |
| 6,868,921 B2 | 3/2005 | Burrows et al. |
| 7,111,693 B1 | 9/2006 | Self et al. |
| 7,165,632 B2 | 1/2007 | Burrows et al. |
| 7,306,053 B2 | 12/2007 | Burrows et al. |
| 7,472,761 B2 | 1/2009 | Burrows et al. |
| 7,743,848 B2 * | 6/2010 | Burrows ................. E21B 44/00 175/26 |
| 7,967,080 B2 | 6/2011 | Burrows et al. |
| 8,157,023 B2 | 4/2012 | Burrows et al. |
| 8,342,262 B2 | 1/2013 | Burrows et al. |
| 8,622,150 B2 * | 1/2014 | Burrows ................. E21B 7/046 175/26 |
| 9,371,725 B2 | 6/2016 | Burrows et al. |
| 2003/0062200 A1 | 4/2003 | Blackman |
| 2003/0102868 A1 | 6/2003 | Brune et al. |
| 2003/0104158 A1 | 6/2003 | Gui et al. |
| 2003/0111268 A1 | 6/2003 | Alft et al. |
| 2003/0136583 A1 | 7/2003 | Brune et al. |
| 2004/0028476 A1 | 2/2004 | Payne et al. |
| 2004/0045739 A1 | 3/2004 | Mercer et al. |
| 2004/0084218 A1 | 5/2004 | Brune et al. |
| 2004/0237840 A1 | 12/2004 | Yamamoto et al. |

\* cited by examiner

BORING TOOL TRACKING FUNDAMENTALLY BASED ON DRILL STRING LENGTH, PITCH AND ROLL

This application is a continuation application of copending application Ser. No. 16/370,702 filed on Mar. 29, 2019; which is a continuation application of application Ser. No. 15/177,297 filed Jun. 8, 2018 and issued as U.S. Pat. No. 10,246,985 on Apr. 2, 2019; which is a continuation application of application Ser. No. 14/097,180 filed Dec. 4, 2013 and issued as U.S. Pat. No. 9,371,725; which is a continuation application of Ser. No. 13/688,314 filed Nov. 29, 2012 and issued as U.S. Pat. No. 8,622,150 on Jan. 7, 2014; which is a continuation application of Ser. No. 13/422,690 filed Mar. 16, 2012 and issued as U.S. Pat. No. 8,342,262 on Jan. 1, 2013; which is a continuation application of Ser. No. 13/151,517 filed Jun. 2, 2011 and issued as U.S. Pat. No. 8,157,023 on Apr. 17, 2012; which is a continuation application of Ser. No. 12/780,421 filed May 14, 2010 and issued as U.S. Pat. No. 7,967,080 on Jun. 28, 2011; which is a continuation application of Ser. No. 12/325,182 filed Nov. 29, 2008 and issued as U.S. Pat. No. 7,743,848 on Jun. 29, 2010; which is a continuation application of Ser. No. 11/930,483 filed Oct. 31, 2007 and issued as U.S. Pat. No. 7,472,761 on Jan. 6, 2009; which is a continuation application of Ser. No. 11/609,786 filed Dec. 12, 2006 and issued as U.S. Pat. No. 7,306,053 on Dec. 11, 2007; which is a continuation application of Ser. No. 11/051,878 filed Feb. 5, 2005 and issued as U.S. Pat. No. 7,165,632 on Jan. 23, 2007; which is a continuation application of Ser. No. 10/341,922 filed Jan. 13, 2003 and issued as U.S. Pat. No. 6,868,921 on Mar. 22, 2005; the disclosures of which are incorporated herein by reference.

The present invention relates generally to the field of directional drilling and, more particularly, to a directional drilling system which provides for tracking of a boring tool fundamentally requiring no more than pitch and roll measurements as measured parameters. In one feature, measurement error compensation is accomplished using a Kalman filter within the framework of a heretofore unseen set of coupled ordinary differential equations.

BACKGROUND OF THE INVENTION

A boring tool, or other such underground object, is characterized in a drilling region by six unknown parameters comprising a location in three dimensional space, described using some form of coordinates, and orientation parameters that are generally referred to as pitch, roll and yaw. The former two orientation parameters are rather readily measurable in a direct way, as is typically accomplished in the prior art, by using sensors that are positioned within the boring tool for movement therewith. The yaw orientation parameter, however, is considerably more difficult to determine in the context of prior art techniques, as will be discussed below. Moreover, direct measurement of yaw using, for example, a magnetometer in the boring tool is more problematic than direct measurement of pitch and roll orientation which can be performed with relatively simple mechanical type sensors or based on accelerometers readings. A particular problem resides in such direct yaw measurements being prone to significant levels of measurement error in the presence of magnetic interference.

One class of prior art, as exemplified by U.S. Pat. No. 5,764,062 (hereinafter the '062 patent), entitled TECHNIQUE FOR ESTABLISHING AND RECORDING A BORING TOOL PATH USING A SURVEY REFERENCE LEVEL, simply ignores yaw as an unknown for purposes of position determination. That is, all remaining parameters are integrated to track the underground position of the boring tool.

More recently, another class of system has been developed which accounts for yaw orientation. U.S. Pat. No. 6,035,951 (hereinafter the '951 patent), entitled SYSTEMS, ARRANGEMENTS AND ASSOCIATED METHODS FOR TRACKING AND/OR GUIDING AN UNDERGROUND BORING TOOL, which is commonly assigned with the present application and hereby incorporated by reference, serves as a sophisticated, robust example of such a system. While this system provided remarkable and sweeping advantages over the then-existing prior art and continues to be highly effective, one feature is shared with the prior art respecting determination of yaw orientation. Specifically, an electromagnetic locating signal is transmitted from the boring tool which is measured at one or more above ground locations. The measurement of the locating signal then contributes in a direct manner to the determination of yaw orientation. At least in a general sense, the prior art has accepted the precept that measurement of electromagnetic flux is a preferred way to resolve yaw orientation.

The present invention accounts for yaw in all of its various forms and, at the same time, sweeps aside the foregoing precept of the prior art in a highly advantageous manner while providing still further advantages.

SUMMARY OF THE INVENTION

As will be described in more detail hereinafter, there is disclosed herein an arrangement and associated method for use in tracking and/or guiding the movement and an overall orientation of an underground boring tool, characterized by a pitch orientation and a roll orientation, in a region of ground. In one aspect of the present invention, the arrangement is used as part of a system such that the boring tool is steerable underground using the roll orientation. The boring tool may be advanced using a drill string which exhibits a maximum drill string curvature in the region. The boring tool is configured for advancing in a straight ahead mode during a continuous roll and is further configured for advancing in a steering mode by moving the boring tool at a fixed roll orientation. The boring tool is advanced over a path segment in the region using at least one of the straight ahead mode and the steering mode. An averaged roll characteristic is determined for movement of the boring tool along the path segment. A path segment pitch orientation is determined based on at least one measured pitch orientation of the boring tool along the path segment. Using the maximum drill string curvature in combination with the averaged roll characteristic and the path segment pitch orientation, the yaw orientation of the boring tool is determined. In one feature, the boring tool is advanced through a series of positions that are spaced across the path segment, separated by an at least generally equal increment for measuring a series of roll positions of the boring tool and the averaged roll characteristic is established using the measured series of roll positions. Accordingly, determination of yaw orientation can be based in a fundamental way on pitch and roll orientation measurement. In another feature, the need for using the maximum path curvature in the yaw orientation determination is eliminated by requiring that movement of the boring tool over the path segment exhibits a significant vertical component of movement.

In another aspect of the present invention, the boring tool is advanced over a path segment having a vertical component of motion in the region using at least the steering mode. An averaged roll characteristic of the boring tool is established for the path segment. A path segment pitch orientation is determined based on at least one measured pitch orientation of the boring tool along the path segment. Using the averaged roll characteristic and the path segment pitch orientation, the yaw orientation of the boring tool is determined. In accordance with this aspect of the present invention, determination of maximum path curvature is not required.

In still another aspect of the present invention, a system is described for tracking a boring tool which may be advanced in an underground region responsive to a drill string. The boring tool exhibits an overall orientation that is characterized by a pitch orientation, a yaw orientation and a roll orientation, and is steerable underground in the region using the roll orientation. The boring tool is configured for advancing in a straight ahead mode during a continuous roll and further for advancing in a steering mode by moving the boring tool at a fixed roll orientation. The boring tool is advanced over a series of path segments, each of which includes a start position and an end position, using at least one of the straight ahead mode and the steering mode during each path segment. Each path segment includes a segment length such that the start position of each successive one of the path segments coincides with a last-determined end position within the series of path segments. An incremental change in the pitch orientation and an incremental change in the yaw orientation of the boring tool over a current one of the path segments are determined based, at least in part, on a series of roll measurements that are taken during the current path segment for use in tracking the boring tool over the current path segment. In one feature, the incremental change in the pitch orientation and the incremental change in the yaw orientation for the current path segment are determined by determining a maximum path curvature of the drill string in the region for a fixed roll orientation of the boring tool in the steering mode. A set of data is measured relating to a series of roll positions of the boring tool at a corresponding series of positions that are spaced across the current path segment, separated by an at least generally equal increment, as the boring tool advances through the current path segment. Thereafter, the incremental change in the pitch orientation and the incremental change in the yaw orientation are established using the set of data in combination with the maximum curvature of the drill string. In another feature, extrapolation is performed from the start position of the current path segment to determine a predicted location of its end position and to determine a predicted overall orientation at its end position based, at least in part, on (i) the last-determined end position, (ii) the incremental change in the pitch orientation and (iii) the incremental change in the yaw orientation. A current path segment pitch orientation is determined using at least one measured pitch orientation of the boring tool taken along the current path segment. The predicted location and predicted overall orientation for the end position of the current path segment are corrected, based at least in part on the current path segment pitch orientation, to resolve a corrected location of the boring tool which more accurately tracks the end position of the current path segment. In still another feature, a current path segment yaw orientation is determined using at least one measured yaw orientation of the boring tool taken along the current path segment and the correction uses the current path segment yaw orientation in combination with the current path segment pitch orientation to resolve the corrected location of the boring tool.

In one technique of the present invention, the boring tool includes means for transmitting an electromagnetic locating signal which behaves consistently with a set of electromagnetic equations and the system includes means for measuring the electromagnetic locating signal at one or more receiving locations to produce a measured set of electromagnetic readings. The set of electromagnetic readings is measured at the end position of the current path segment and the aforementioned extrapolation determines a predicted set of the electromagnetic readings at the end position. A correction procedure compares the predicted set of electromagnetic readings for the end position of the current path segment to the measured set of electromagnetic readings to further resolve the corrected location of the boring tool. In one feature, a current path segment yaw orientation is determined using at least one measured yaw orientation of the boring tool taken along the current path segment and the correction procedure uses the current path segment yaw orientation, the current path segment pitch orientation and a comparison of the predicted and measured sets of electromagnetic readings to enhance the corrected position of the boring tool.

In yet another aspect of the present invention, a system is described for tracking a boring tool which moves in an underground region having an overall orientation that is characterized by a pitch orientation, a roll orientation and a yaw orientation. A set of coupled ordinary differential equations is used to characterize a rate of change of at least the pitch orientation and the yaw orientation of the boring tool as well as a position of the boring tool in the region. With movement of the boring tool in the region, the set of coupled ordinary differential equations is integrated to track a predicted overall orientation and a predicted position of the boring tool. In one feature, one or more measured parameters are used during progression of the boring tool to enhance accuracy of the predicted overall orientation and the predicted position of the boring tool. In another feature, the one or more measured parameters are used in a corrector step of a Kalman filter.

In a continuing aspect of the present invention, a system is described for tracking a boring tool which moves in an underground region having an overall orientation that is characterized by a pitch orientation, a yaw orientation and a roll orientation, and which is steerable underground in the region using the roll orientation. The boring tool is configured for advancing in a straight ahead mode during a continuous roll applied by the drill string and is further configured for advancing in a steering mode by moving the boring tool at a fixed roll orientation applied by the drill string. A set of initial parameters is established at a first position of the boring tool including at least an initial pitch orientation and an initial yaw orientation. The boring tool is advanced over a first segment from the first position to a second position in the region using at least one of the straight ahead mode and the steering mode to establish a nominal path while measuring a segment length of the first segment. An incremental change in the pitch orientation and an incremental change in the yaw orientation of the boring tool are established over the first segment. Extrapolation is performed from the first position to determine a predicted location of the second position and to determine a predicted overall orientation at the second position based, at least in part, on (i) the set of initial parameters, (ii) the incremental change in the pitch orientation, (iii) the incremental change in the yaw orientation and (iv) the measured segment length. A path segment pitch orientation is determined using at least one measured pitch orientation of the boring tool along the path segment. The predicted location and predicted overall orientation at the second position are determined, based at least in part on the path segment pitch orientation, to resolve a corrected location of the boring tool which more accurately characterizes the second position.

BRIEF DESCRIPTION OF THE DRAWINGS

The present invention may be understood with reference to the detailed description taken in conjunction with the drawings briefly described below.

FIG. 5b is a dual plot against arc length s of the drill path showing error in x and y positional coordinates for the predicted positions of FIG. 5a.

DETAILED DESCRIPTION OF THE INVENTION

Figure 1:
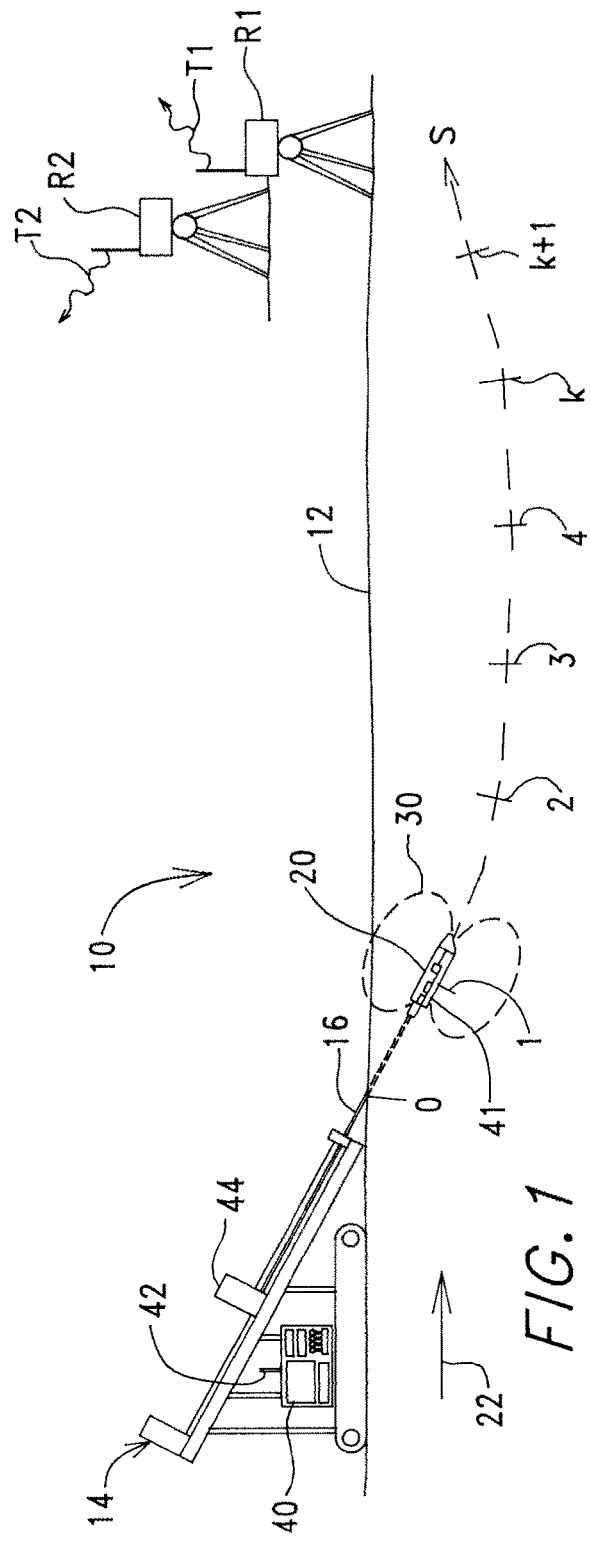
FIG. 1 is a diagrammatic view, in elevation, of a drilling system that is produced in accordance with the present invention and shown here to illustrate details with respect to its operation including reference positions along a drill path of the boring tool.

Turning now to the figures wherein like components are indicated by like reference numbers throughout the various figures, attention is immediately directed to FIG. 1 which diagrammatically illustrates a horizontal directional drilling system generally indicated by the reference number 10 and produced in accordance with the present invention. It is noted that the figures are not to scale for purposes of illustrative clarity and that like reference numbers refer to like components wherever possible throughout the various figures. FIG. 1 is an elevational view of system 10 operating in a region 12. System 10 includes a drill rig 14 having a drill string 16 extending therefrom to a boring tool 20. The drill string is pushed into the ground to move boring tool 20 at least generally in a forward direction 22 indicated by an arrow.

In the illustrated technique of system 10, a locating signal 30 is transmitted from the boring tool to receivers R1 and R2 positioned on the surface of the ground. It is to be understood, however, that neither locating signal 30 nor receivers R1 and R2 are required, as will be described in detail at an appropriate point below. In techniques which employ the use of a locating signal and associated receivers, however, and as is described in the above incorporated '951 patent, the position of the boring tool may be determined, at least in part, based upon certain characteristics of locating signal 30 at R1 and R2. In any implementation of the present invention using an electromagnetic locating signal, measurement of the locating signal produces a set of electromagnetic readings that is used to further resolve a predicted position and orientation of the boring tool within region 12. The location of the boring tool within region 12 as well as the underground path followed by the boring tool may be established and displayed at drill rig 14, for example, on a console 40. Information is transmitted from R1 and R2 to the drill rig via telemetry signals T1 and T2, respectively. In addition, information regarding certain parameters of the boring tool such as, for example, pitch and roll (orientation parameters) and temperature are encoded onto locating signal 30 during drilling, for receipt by R1 and R2. These parameters may be measured by a suitable sensor arrangement 41 located within the boring tool which may include, for example a pitch sensor, a roll sensor and, in certain implementations, a yaw sensor such as a magnetometer. After encoding, the information is thereafter transmitted to drill rig 14 via T1 and T2, for receipt by an antenna 42 at the drill rig. Along with the drilling path, any parameter of interest in relation to drilling such as, for example, pitch may be displayed on display 40.

Figure 2:
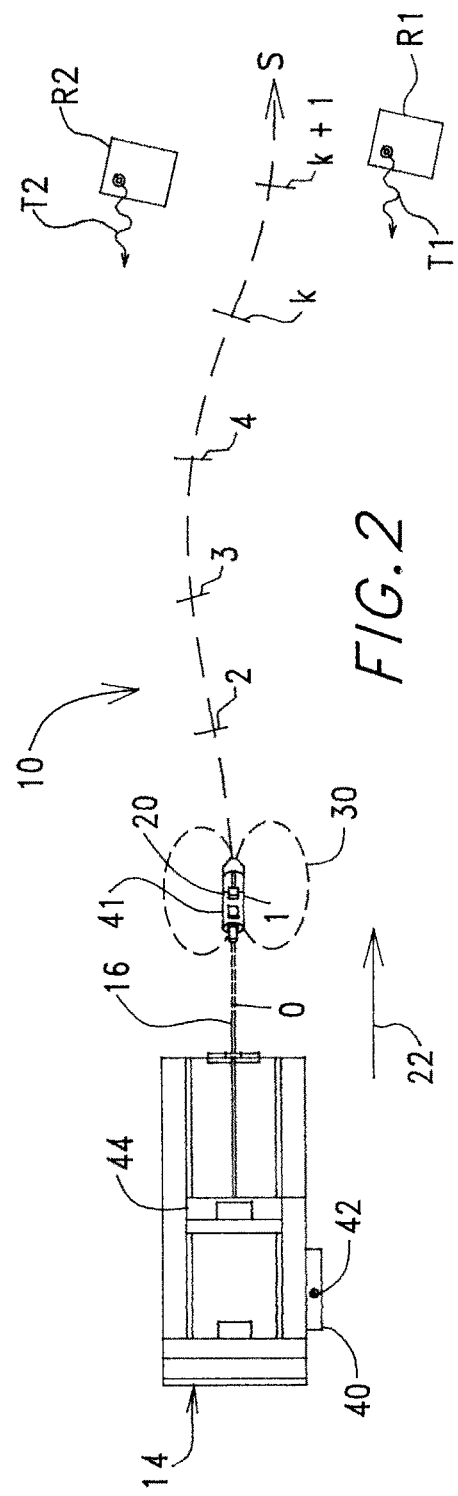
FIG. 2 is a diagrammatic plan view of the system of FIG. 1 showing further details of the drill path.

Referring to FIG. 2 in conjunction with FIG. 1, drill string 16 is segmented, being made up of a plurality of removably attachable, individual drill pipe sections having a section or segment length. The drill pipe sections may be referred to interchangeably as drill rods having a rod length. During operation of the drill rig, one drill pipe section at a time is pushed into the ground by the drill rig using a movable carriage 44. Drill rig 14 may include any suitable arrangement for measuring movement of the drill string into the ground such as is described, for example, in the above incorporated '951 patent. As will be seen, movement of the drill pipe into the ground by an incremental amount may trigger measurements of certain orientation parameters of the boring tool. Other orientation parameters may be measured more intermittently. For example, measurements can be made responsive to completion of pushing each drill pipe section into the ground. Still further measurements may be made upon completing and/or starting a new drill pipe section. In this regard, positions k of the boring tool, where k=0, 1, 2, etc. is an integer indicative of a particular position, correspond to a plurality of positions through which the boring tool is steered and at each of which a new drill pipe section is added to the drill string. With regard to the drill string, particularly in consideration of those techniques of the present invention which do not require transmission of a locating signal, it is important to understand that any data and/or parameters measured at the boring tool may be transferred to the drill rig through the drill string. Highly advantageous systems for accomplishing such a transfer using a segmented drill string are described in commonly assigned U.S. Pat. No. 6,223,826, entitled AUTO-EXTENDING/RETRACTING ELECTRICALLY ISOLATED CONDUCTORS IN A SEGMENTED DRILL STRING, as well as copending U.S. application Ser. Nos. 09/793,056 and 09/954,573, all of which are incorporated herein by reference.

A number of techniques, referred to herein as A to D, are described for tracking position and pointing direction of an underground drill head. One element of techniques A, B and C is data processing employing a Kalman filter in order to minimize the effect of data measurement errors, although it is to be understood that any other suitable technique for minimization of such errors such as, for example, a least squares approach is equally applicable. Techniques A and B require at least one tri-axial antenna cluster (at least one of R1 and R2) for the measurement of locating field 30. These antenna clusters, which may be referred to as cones in this disclosure, may be installed above or below the ground surface. Any number of cones can be handled without modifications. Another important new feature that remains to be described in this disclosure is the formulation of a set of coupled first-order ordinary differential equations, referred to as rod equations, suited for tracking a drill head (boring tool) under realistic drilling conditions in one unified approach. These rod equations are considered to be highly advantageous, in and by themselves, and Applicants are unaware of their existence heretofore.

Nomenclature

The various equations described below and in the figures utilize the following nomenclature:

$b_x, b_y, b_z$=components of flux for unit dipole strength in a global or overall local coordinate system defined in the drilling region F=continuous state equations matrix
H=observation coefficient matrix
N=number of roll angles measured along a distance $\Delta s$
P=error covariance matrix
Q=continuous process noise covariance parameter matrix
$Q_k$=discrete process noise covariance matrix
R=observation covariance matrix
$\overline{\sin\theta}, \overline{\cos\theta}$=steering/drilling parameters
s=arc length along rod axis
$\vec{x}=(\delta x, \delta y, \delta z, \delta\iota, \delta\phi, \delta\zeta)'$, state variables vector
x,y,z=global coordinates, origin at drill begin
$\bar{x},\bar{y},\bar{z}$=coordinates parallel to global, origin at center of transmitter
$\vec{z}$=measurement vector
$\beta$=yaw angle, rotation about $\vec{z}$-axis
$\delta x, \delta y, \delta z$=position state variables
$\delta\kappa, \delta\phi, \delta\zeta$=curvature, pitch and yaw state variables
$\Delta s$=rod length increment
$\phi$=pitch angle
$\Phi_k$=discrete state equation transition matrix
$\kappa$=maximum drill path curvature
$\theta$=roll angle
$\sigma$=standard deviation
$\sigma^2$=variance, square of standard deviation
$\zeta$=yaw angle, rotation about transmitter $z_t$-axis
Subscripts
k k-th position on drill path
m measured
t transmitter coordinates
Superscripts
( )' transpose
( )* nominal drill path
( )⁻ last available estimate
(˙) derivative d/ds
$\vec{\hat{x}}$ state variables estimate
Components for Implementations of Tracking System Techniques Each technique requires different equipment combinations for drill head tracking, as summarized in Table 1.

TABLE 1

| Component | Technique A | Technique B | Technique C | Technique D |
|---|---|---|---|---|
| Transmitter | | | | |
| magnetic dipole generator | Yes | Yes | No | No |
| pitch sensor | Yes | Yes | Yes | Yes |
| roll sensor | Yes | Yes | Yes | Yes |
| yaw sensor | No | Yes | * | No |
| Cones | Yes | Yes | No | No |
| Rod length measuring device | Yes | Yes | Yes | Yes |

* Indicates optional components, as described in further detail below.

As a general summary of the information in Table 1, techniques A and B employ the tracking system illustrated in FIGS. 1 and 2 to monitor the position of the boring tool. This system features one or more stationary cones either above or below the ground surface and associated data acquisition and processing capability. Each cone contains a cluster of tri-axial antennas for flux measurements. In addition, the cones are equipped with sensors to measure their angular orientation with respect to a "global" coordinate system. It is to be understood that the extents of this coordinate system need be global only in terms of covering the entirety of the drilling region of interest and is, therefore, intended only as designating a "senior" measurement framework assigned within the local region. Of course, the term "coordinate system", as used herein, is defined broadly as merely a convenient construction for referencing physical world locations in descriptive terms. The position coordinates of all cones are recorded before drilling begins. An unlimited number of cones can be handled by the described techniques without modification. Furthermore, techniques A and B require a transmitter designed to generate a magnetic dipole field from the boring tool and instrumentation to measure pitch and roll orientation of the boring tool. The need for a yaw measurement device in the boring tool depends on the choice of tracking technique. It is noted that techniques C and D are suited for use in a more minimalistic tracking system, as compared to the robust techniques A and B, since these techniques do not rely on the measurement of a magnetic field generated from the boring tool.

All of these techniques require measurements of drill rod length changes in a suitable manner such as, for example, by using a potentiometer or ultrasonic sensor such as described in the '951 patent. For some applications where rod length does not vary much during the bore and a more limited tracking accuracy is sufficient, a simple counter for the number of drill rods and measurement of a nominal rod length can be substituted.

Measured Data

Measured data required as input for the tracking techniques are listed below. Note that techniques A, B, C and one version of implementation D require an estimate of the maximum rod curvature achievable during pure steering where the drill head is pushed into the soil while keeping its roll position unchanged. This curvature must either be known from previous steering with the same equipment in similar soil or could be obtained from a preliminary test measuring the change of pitch angle $\Delta\phi$ over one rod length $l_{rod}$ with the drillhead in the 12 o'clock roll position. Maximum curvature is then given by $\kappa = \Delta\phi / l_{rod}$.

Measured Data in Techniques A and B
Fluxes $b_x, b_y, b_z$ at each cone for unit dipole strength
Rod length increment $\Delta s$
Transmitter pitch angle $\phi$
Transmitter yaw angle $\beta$ (method B only)
Transmitter roll angle $\theta$ at N equal intervals along $\Delta s$
Maximum rod curvature K achievable during steering at a fixed roll angle Measured Data in Techniques C and D
Rod length increment $\Delta s$
Transmitter pitch angle $\phi$
Transmitter yaw angle $\beta$ (technique C only)
Transmitter roll angle $\theta$ at N equal intervals along $\Delta s$
Maximum rod curvature K achievable during steering at a fixed roll angle (only for one version of technique D)

Definitions for Drilling and Steering

In horizontal directional drilling, three different types of drilling techniques are in use to achieve a desired drill path. In this disclosure, these drilling techniques are referred to as "drilling", "steering", and, for lack of a better term, "alternate drilling/steering". The boring tool features a drill bit designed such that a pure rotating motion ("drilling") will form a straight drill path in a homogeneous soil. Positioning the drill bit at a fixed roll angle ("steering") allows steering along a curved drill path that has the maximum achievable (i.e., tightest) rod curvature during steering. Rotation and thereby roll orientation control of the boring tool may be accomplished in at least two ways: first, the drill string itself may be rotated by the drill rig with the boring tool attached thereto; second, the boring tool may be rotated at the end of the drill string using a suitable motor arrangement such as, for example, a drill mud powered hydraulic motor or an electric motor that is powered through the drill string. Maximum curvature depends on drill bit design, soil conditions, drill rod dimensions, rod bending characteristics and drill mud. The user can alternate between drilling and steering along a rod ("alternate drilling/steering") to move the tool along a drill path with less curvature. All tracking techniques described herein are able to account for steering, drilling and such a mixed mode of operating the boring tool in one unified analysis.

Assuming roll angle $\theta$ of the boring tool is measured N times at equal intervals along a section $\Delta s$ of the drill rod (for example, from k=0 to k=1 in FIG. 1). These roll measurements may be made on-the-fly, as the drill string advances in the ground. The following roll parameters are defined where the overbar indicates an average value.

$$\overline{\sin\theta} = \frac{1}{N}\sum_{i=1}^{N}\sin\theta_i \qquad (1)$$

$$\overline{\cos\theta} = \frac{1}{N}\sum_{i=1}^{N}\cos\theta_i \qquad (2)$$

In essence, these expressions represent a set of data that is determined based on roll measurements that are taken at the spaced apart incremental positions. It is recognized that both $\overline{\sin\theta}$ and $\overline{\cos\theta}$ go to zero for a given distance with a constant rate of roll and a plurality of measurements of roll angle taken at equally spaced apart increments along the given distance. The number of measurement positions should be sufficient to characterize the roll motion of the boring tool over the segment of the boring tool to a suitable approximation. For example, two measurements is considered to be insufficient, while a measurement every six inches along the segment is considered to be suitable. As another example, one hundred measurements for a drill rod having a length of ten feet is satisfactory, of course, accuracy generally increases with increasing numbers of measurements. The number of roll measurements may be based on system limitations including sensor limitations and processing power. That is, any system exhibits some minimum measurement time that is required to perform a roll measurement. Accordingly, the number of roll measurements, contributing to the results of equations 1 and 2, may be maximized based on this system determined minimum roll measurement time. The definitions of equations 1 and 2 correspond to the averaged sine and cosine of the roll angles and allow for clearly distinguishing between drilling, steering, and alternate drilling/steering on the basis of a steering parameter $\sqrt{\overline{\sin\theta}^2 + \overline{\cos\theta}^2}$. This parameter is equal to zero for straight ahead drilling, one for steering at a constant roll angle and assumes intermediate values for alternate drilling/steering.

Governing Equations

Figure 3:
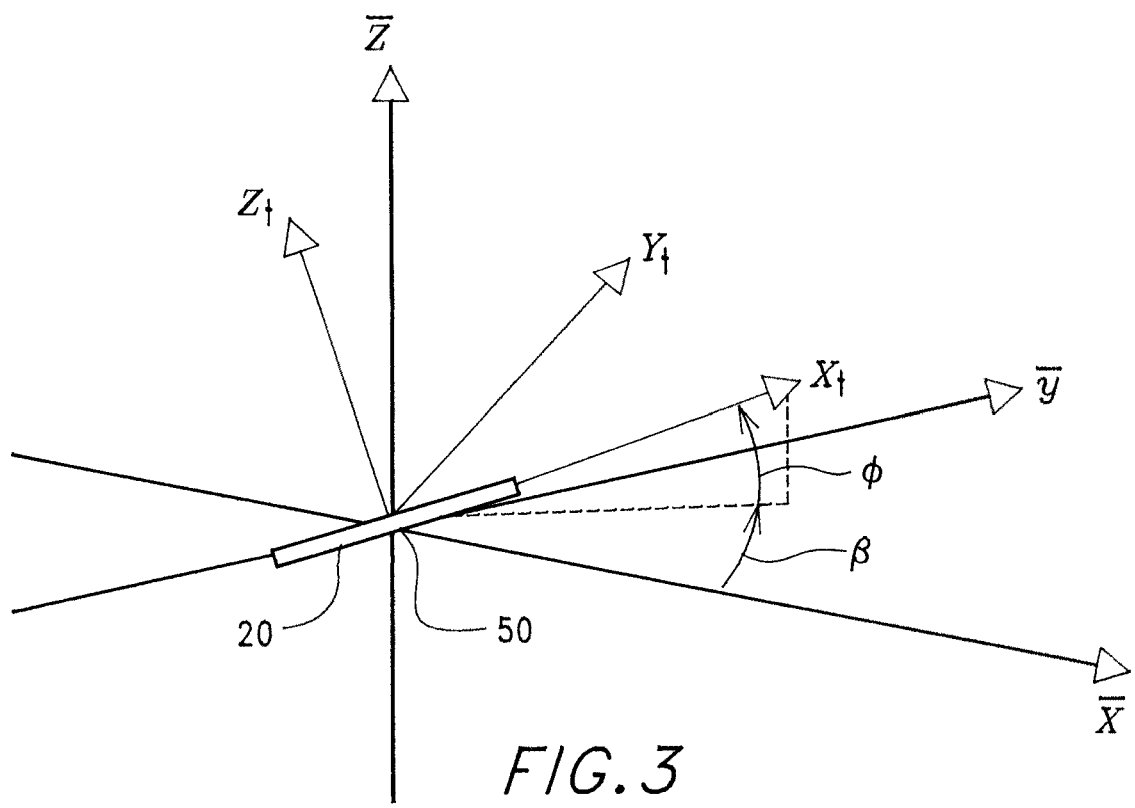
FIG. 3 is a diagrammatic perspective view of a boring tool showing its orientation in a global coordinate system and in a transmitter coordinate system, as well as showing pitch and yaw orientation of the boring tool.
Figure 4:
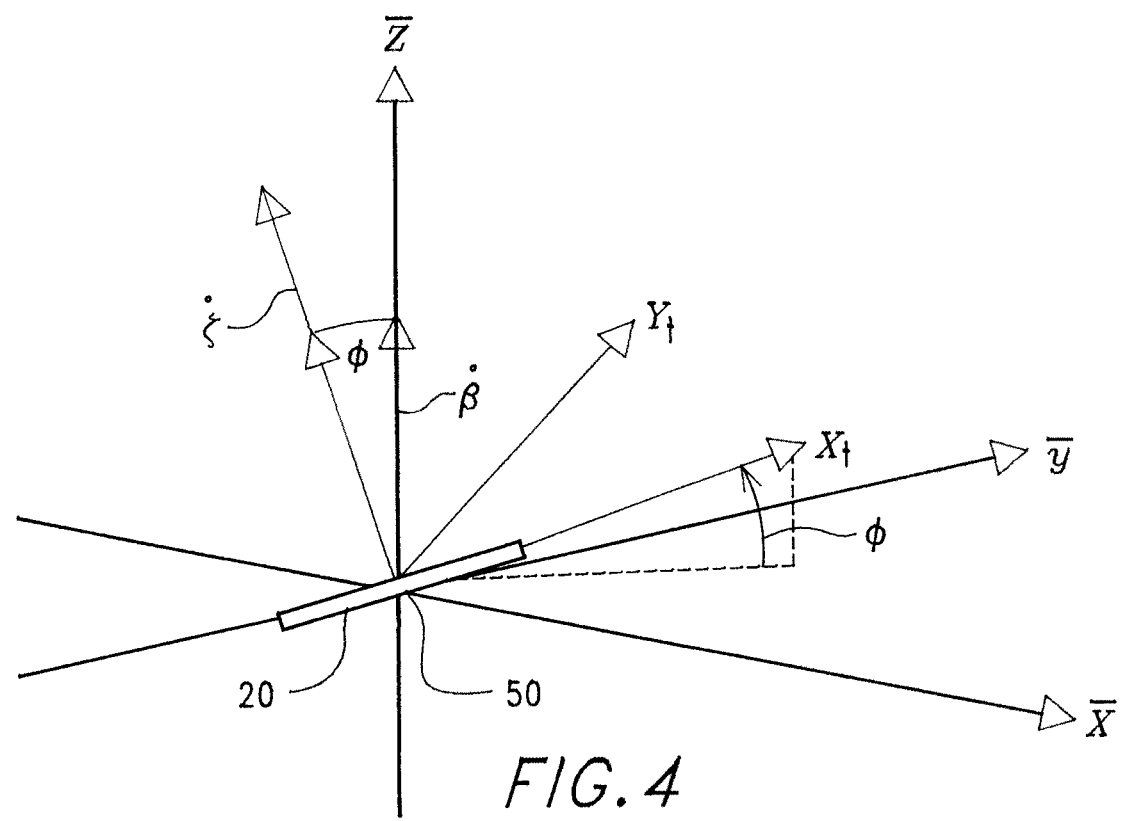
FIG. 4 is another diagrammatic perspective view of the boring tool of FIG. 3 showing further details with respect to orientation parameters used herein including a relationship between yaw in transmitter coordinates versus yaw in global coordinates with respect to pitch axes that are angularly skewed by the pitch of the boring tool.

Referring to FIGS. 3 and 4, for purposes of illustrating the relationships among the variables, the following set of differential equations, termed rod equations in this disclosure, describes the path of a boring tool for drilling, steering and alternate drilling/steering. All techniques described herein rely on these equations.

$$\dot{x} = \cos\beta\cos\phi \qquad (3)$$

$$\dot{y} = \sin\beta\cos\phi \qquad (4)$$

$$\dot{z} = \sin\phi \qquad (5)$$

$$\dot{\kappa}=0 \tag{6}$$

$$\dot{\phi}=\kappa\overline{\cos\theta} \tag{7}$$

$$\dot{\zeta}=-\kappa\overline{\sin\theta} \tag{8}$$

Here, arc length s, measured along the drill rod axis including its curvature, is chosen to be an independent variable. The superscript dot denotes derivatives with respect to s. The variables x,y,z denote drill path coordinates in the aforementioned global system with a global origin 50 at the point of drill begin (position k=0 in FIGS. 1 and 2). The symbol κ denotes the maximum drill rod curvature that is only achievable with pure steering at a constant or fixed roll angle. This curvature is approximately constant along the length of the bore as long as soil conditions and steering effectiveness are unchanged. The symbol ϕ represents pitch angle (positive "nose up"), as is illustrated.

The analysis employs two different yaw angles, termed β and ζ. Angle β is the rotation angle about the z axis (parallel to the global z axis), defined positive counterclockwise when looking down onto the ground surface, as can be seen in the perspective view of FIG. 3. The nomenclature $x_t, y_t$ and $z_t$ denotes a set of orthogonal axes that move with boring tool 20 having axis $x_t$ coinciding with an elongation axis of the boring tool, axis $y_t$ is normal to $x_t$ and horizontal, and $z_t$ is normal to the $x_t, y_t$ plane. In the instance where system 10 uses a locating signal, the origin of the $x_t, y_t, z_t$ coordinate system coincides with the origin of locating signal 30 which is generally arranged at some point along an elongation axis of the boring tool. Yaw angle ζ arises from a rotation about the $z_t$ axis. FIG. 3 illustrates the following relationship between the two types of yaw rotations.

$$\dot{\zeta}=\dot{\beta}\cos\phi \tag{9}$$

That is, the rate of change in ζ is directly related to the rate of change in β by the cosine of ϕ. In addition to the rod equations, well-known equations describing the field of a three-dimensional magnetic dipole are utilized. These dipole equations are given immediately below for the reader's convenience:

$$(b_x, b_y, b_z)' 3x_s r^{-5}\vec{r} - r^{-3}\vec{t}_1 \tag{10}$$

$$x_s = \vec{t}_1' \cdot \vec{r} \tag{11}$$

$$\vec{r} = (x_c - x, y_c - y, z_c - z)' \tag{12}$$

$$\vec{t}_1 = (\cos\beta\cos\phi, \sin\beta\cos\phi, \sin\phi)' \tag{13}$$

The dipole equations provide the flux induced by a three-dimensional magnetic dipole of unit strength at a cone positioned at $(x_c, y_c, z_c)$. Here, the superscript "prime" indicates the transpose of a vector.

Attention is now directed to specific details of each of tracking techniques A-D, beginning with tracking technique A.

Tracking Technique A

The posed problem is an initial value problem for determining drill path parameters x,y,z,κ,ϕ,ζ. Rod equations 3-8 and magnetic dipole equations 10-13 are solved, taking measured pitch and magnetic fluxes into account. Drilling begins at the origin of the global coordinate system (FIGS. 1 and 2, position k=0) where values of curvature, pitch and yaw angles must be known, the latter two for example, through sensors. It should be appreciated that any position may serve as a starting position for initiation of the procedure so long as these values can be determined. Furthermore, an estimate of the expected accuracy of initial values of all drill path parameters must be available to form the Kalman filter error covariance matrix $P_1$. All elements of $P_1$ are zero except for the three diagonal variances $\sigma_{\kappa_1}^2$, $\sigma_{\phi_1}^2$, $\sigma_{\zeta_1}^2$ representing the accuracy of $\kappa_1, \phi_1, \zeta_1$.

Starting with these known initial values at drill begin (k=0), the set of rod equations is integrated along the drill path. Having determined all drill path parameters at the k-th position and measuring pitch and fluxes at all cones with the transmitter at the next, (k+1)-st position, the parameters of this new position are obtained in three steps, as follows:

Step 1: A location on a nominal drill path is determined by quadratic extrapolation from the last known position. The nominal drill path is a circular arc from the k-th to the (k+1)-st position, defined by the variables x*,y*,z*,κ*, ϕ*, β*. The analysis starts with an estimate of the change of pitch and yaw angles, Δϕ,Δζ, along the rod length element As determined from rod equations (2e) and (2f). While the present description uses the drill pipe section (or rod length) as Δs, it is to be understood that any suitable length may be used as an alternative in view of the teachings herein.

Variables defining the nominal drill path at the (k+1)-st drill path position depend on known values at the k-th position and on Δϕ and Δζ. Quadratic extrapolation can be performed, for example, applying published mathematical techniques such as the one of J. W. Burrows titled "Mathematics of Strapdown Inertial Navigation", International Congress on Industrial and Applied Mathematics (ICIAM), 1987. Having determined the nominal drill path, magnetic fluxes emitted by a transmitter on this path can be calculated at each cone position using dipole equations 10-13.

Step 2: Employing Kalman filter analysis procedure, equations governing state variables are derived by linearizing rod equations 3 through 8. State variables, used herein, comprise differences between the nominal drill path and the final drill path, as predicted by Kalman filter analysis, for position coordinates x,y,z, curvature κ, pitch ϕ and yaw β or ζ. State variables and their governing continuous state equations read $$\vec{x} = (\delta x, \delta y, \delta z, \delta\kappa, \delta\phi, \delta\zeta)' \tag{14}$$

$$\dot{\vec{x}} = F\vec{x} + \vec{u} \tag{15}$$

with $$F = \begin{bmatrix} 0 & 0 & 0 & 0 & -\cos\beta\sin\phi & -\sin\beta \\ 0 & 0 & 0 & 0 & -\sin\beta\sin\phi & \cos\beta \\ 0 & 0 & 0 & 0 & \cos\phi & 0 \\ 0 & 0 & 0 & 0 & 0 & 0 \\ 0 & 0 & 0 & \overline{\cos\theta} & 0 & 0 \\ 0 & 0 & 0 & -\overline{\sin\theta} & 0 & 0 \end{bmatrix}$$

Here, the symbol $\vec{u}$ represents the process noise vector.

The discrete state equation transition matrix $\Phi_k$ is required for this Kalman filter analysis:

$$\Phi_k = I + F\Delta s \tag{16}$$

where I is the identity matrix. Note $\Phi_k = I$ if $\Delta s = 0$. This recognition is used to process multiple cone flux observations with boring tool 20 at one position. That is, fluxes measured by R1 and R2 of FIGS. 1 and 2 are processed separately.

Update of error covariance matrix P at each new position also requires a discrete covariance matrix $Q_k$. It is obtained in a manner similar to $\Phi_k$ in terms of the continuous process noise covariance parameter matrix by $Q_k=Q\Delta s$, where Q represents unmodelled increases in the error covariance matrix P per rod foot. Only the diagonal coefficients of Q are nonzero.

$$Q_{11} = Q_{22} = Q_{33} = Q_{pos}, \frac{ft^2}{ft} \quad (17)$$

$$Q_{44} = \frac{d}{ds}(\sigma_\kappa^2), \frac{1}{ft^3} \quad (18)$$

$$Q_{55} = \frac{d}{ds}(\sigma_\phi^2), \frac{rad^2}{ft} \quad (19)$$

$$Q_{66} = \frac{d}{ds}(\sigma_\zeta^2), \frac{rad^2}{ft} \quad (20)$$

These are empirical coefficients where, for example, $Q_{44}$ represents possible changes of maximum rod curvature due to changing soil conditions.

Measurements (observations) of fluxes and transmitter pitch are assumed to take place at regular intervals $\Delta s$ along the drill path corresponding, in this example, to the drill rod length. With regard to pitch orientation, a path segment pitch orientation is determined based on at least one measured pitch value taken during the course of drilling the length of one drill rod or any suitable path segment length. This pitch value may be sensed, for example, during a concluding or end portion of a current drill rod while adding an additional drill rod to the drill string. As one alternative, any number of pitch measurements can be taken and an average thereof used as the path segment pitch orientation. An update of state variables in the Kalman filter loop utilizes a measurement vector $\vec{z}$, an observation matrix H and an observation covariance matrix R. Applying standard techniques and in view of these teachings, these values be found by linearizing flux equations and transmitter pitch about the nominal drill path. Measurement vector $\vec{z}$ contains the differences between the measured values and estimates of flux components in global coordinates and pitch on the nominal drill path:

$$\vec{z} = (\Delta b_x, \Delta b_y, \Delta b_z, \Delta \phi)' \quad (21)$$

$$\Delta b_x = b_{x_m} - b_x^* \quad (22)$$

$$\Delta b_y = b_{y_m} - b_y^* \quad (23)$$

$$\Delta b_z = b_{z_m} - b_z^* \quad (24)$$

$$\Delta \phi = \phi_m - \phi \quad (25)$$

where equations 22 through 25 represent differences between measured values and estimates on the nominal drill path denoted as $\Delta b_x$, $\Delta b_y$, $\Delta b_z$ and $\Delta \phi$, respectively. Matrix H represents an ideal (noiseless) connection between measurements and state variables vector. Since four of the measured variables are included in the Kalman filter process and six variables are tracked along the drill path, this matrix has four times six coefficients. The coefficients of matrix H are derivatives of measured quantities with respect to drill path variables, evaluated on the nominal drill path and may either be obtained in closed form or as finite differences.

Observation covariance matrix R has zero off-diagonal terms and variances (square of standard deviation) of measured flux components and pitch placed on the diagonal.

Roll angle measurement errors are not accounted for in the solution process since numerical simulation has shown that roll error has little effect on results. Furthermore, rod length measurement errors cannot be accounted for since rod arc length s is used as independent variable of the rod equations.

Instead of processing all components of flux of each cone simultaneously as might be inferred from the measurement vector $\vec{z}$, the method can be modified to update tracking data by processing flux components sequentially. This reduces $\vec{z}$ to two coefficients, representing one flux component and pitch.

Step 3: State variables and estimation errors are calculated using Kalman filter analysis which can be viewed as a predictor-corrector type process. Values of state variables and estimation errors are projected from the current k-th position to the (k+1)-st position (predictor step) and subsequently corrected by the filter (corrector step). The Kalman filter loop is designed to calculate state variables such that estimation errors are minimized. There are several versions of the Kalman filter loop available in the published literature. Examples and the notation adopted for this disclosure can be found in the book of R. G. Brown and P. Y. C. Hwang entitled "Introduction to Random Signals and Applied Kalman Filtering", John Wiley & Sons, 1997.

An estimate of the state vector at the (k+1)-st position as input to the Kalman filter loop is $$\hat{\vec{x}} = \{0\} \quad (26)$$

Additional inputs to the filter loop include the matrices $\Phi$, Q, H, R and the vector $\vec{z}$. The coefficients of Q,R are kept constant during the bore whereas $\Phi$, H, $\vec{z}$ are updated at the (k+1)-st position on the nominal drill path.

Filter loop calculations are performed once for each cone and drill path position. Since the transmitter remains at the same position when processing the next cone, $\Delta s$ is set to zero before reentering the filter loop.

Parameter values at each new drill path position (at the end of each drill rod, in this example) are found by adding state variables to nominal drill path parameters. Estimation error standard deviations are the square roots of the diagonal elements of error covariance matrix P.

Tracking Technique B

Tracking accuracy is further improved by incorporating measured yaw angle, either $\beta$ or $\zeta$, in the Kalman filter process. Hence, technique B adds measured yaw angle to the determination process. The analysis follows closely that of technique A. Rod equations and state variables are the same, but the set of observation equations must be modified to account for measured yaw.

More specifically, if yaw angle $\beta$ is measured, vector $\vec{z}$ must be enlarged to read $$\vec{z} = (\Delta b_x, \Delta b_y, \Delta b_z, \Delta \phi, \Delta \beta)' \quad (27)$$

with $\Delta \beta = \beta_m - \beta^*$ so as to encompass the difference between measured yaw and determined yaw on the nominal drill path. Matrix H is modified since, in this case, five variables are measured and six variables are tracked. Furthermore, observation covariance matrix R must be enlarged accordingly to include the yaw angle variance $\sigma^2_\beta$. Similar modifications are made if yaw angle $\zeta$ is measured instead of $\beta$.

Tracking Technique C

This technique is a simplified form of technique B which does not employ cones for flux measurements and which does not require a transmitter to emit a magnetic dipole field, as well as corresponding receivers. Like techniques A and B, technique C is also based on rod equations 3 through 8 and defines state variables in a like manner. Since only transmitter pitch and yaw are measured, measurement vector $\vec{z}$ is reduced to the following in cases where yaw angle β is measured.

$$\vec{z} = (\Delta\phi, \Delta\beta)' \tag{28}$$

$$\Delta\phi = \phi_m - \phi^* \tag{29}$$

$$\Delta\beta = \beta_m - \beta^* \tag{30}$$

Matrices H and R are modified accordingly. Similar modifications are made if yaw angle ζ is measured.

It should be appreciated that another version of technique C may utilize measured pitch without the need to measure yaw angle. Since only transmitter pitch is measured, measurement vector $\vec{z}$ is reduced to the following:

$$\vec{z} = (\Delta\phi) \tag{31}$$

$$\Delta\phi = \phi_m - \phi^* \tag{32}$$

Once again, matrices H and R are modified accordingly.
Tracking Technique D

For pure steering or alternate drilling/steering a yaw angle change can be calculated combining rod equations 7, 8 and equation 9, as follows:

$$\Delta\beta = -\frac{\Delta\phi}{\cos\phi} \frac{\overline{\sin\theta}}{\overline{\cos\theta}} \tag{33}$$

Theoretically, this equation applies if $|\overline{\cos\theta}| \neq 0$ and $|\phi| \neq 90$ deg. In the instance of pitch, it should be appreciated that a pitch angle of 90 degrees, wherein the boring tool elongation axis is vertically oriented, is rarely seen in horizontal directional drilling applications. However, in order to achieve reliable tracking results, more restrictive conditions should be imposed, for instance $|\overline{\cos\theta}| \geq 0.5$ and $|\phi| \leq 60°$. In the special case of pure steering at a constant roll angle $\theta_s$, the first condition will limit the usable roll angle range to $-60° \leq \theta_s \leq +60°$ and $-120° \leq \theta_s \leq +120°$.

One technique for removing the roll angle limitation from equation 33 resides in deriving maximum steering curvature from a previous drill rod where the steering motion was predominantly up or down. Curvature can be calculated from:

$$\kappa = \frac{\Delta\phi}{\overline{\cos\theta} \cdot \Delta s} \tag{34}$$

Subsequently, the desired yaw angle change is obtained from:

$$\Delta\beta = -\frac{\kappa \cdot \Delta s}{\cos\phi} \overline{\sin\theta} \tag{35}$$

It is noted that this equation applies to all roll angles but assumes that soil conditions have not changed since data were taken for the calculation of curvature based on equation 34.

Once yaw angle is obtained as described, drill path coordinates are obtained by integrating the first three rod equations numbered 3 through 5. This latter integration is well known in drill path tracking.

Having described technique D in detail, it is appropriate at this juncture to note at least certain advantages over the prior art. In particular, this technique provides for yaw determinations based primarily on pitch and roll measurements. In this regard, determination of yaw angle in the prior art has been somewhat problematic. Early methods such as, for example, the '062 patent described above, simply ignored yaw angle. Later methods such as, for example, the '951 patent described above, operated under the assumption that physical measurements extending considerably beyond pitch and roll were required to contribute in a somewhat direct way to the determination of yaw orientation. For example, magnetic flux measurements often have been applied with the objective of determining yaw orientation. While these prior art methods were highly effective in view of the then-existing state of the art, the present invention completely sweeps aside this assumption. As is clearly shown by technique D, a boring tool can be tracked in an effective manner based on pitch and roll measurements alone. The only other required parameters are readily measurable and relate to the drill string itself. Specifically, these parameters are identified as maximum curvature of the drill string in the drilling region and the length of the drill string.

Still considering the advantages of technique D, roll orientation parameter determinations may be performed over a segment of the drilling path at a plurality of equally spaced apart positions, as set forth above in the discussions relating to equations 1 and 2. Any additional measured inputs serve to further enhance position and orientation determinations. For example, such additional inputs include magnetic flux readings and yaw measurements. Accordingly, it is recognized that technique D is fundamental to all of the techniques described herein, as will be further described immediately hereinafter.

The present invention recognizes that yaw determinations may be based upon roll and pitch determinations in conjunction with known extension of the drill string. In a fundamental sense, it is recognized that by measuring extension of the drill string into the ground in combination with measurement of pitch and roll, a resulting position of the boring tool can be predicted. In other words, for a given extension of the drill rod into the ground at a given, averaged roll orientation during the extension and at a given pitch orientation, some determinable portion of the extension contributes to a change in vertical position, thereby influencing pitch orientation, while another determinable portion of the extension contributes to a change in horizontal position, thereby influencing yaw orientation.

Techniques A-D, including any modified forms thereof, may be viewed in a hierarchical fashion having technique D as an underlying foundation. Technique C, executed without measured yaw orientation, builds further by providing a highly advantageous position and orientation tracking framework based on measured roll and pitch orientation values which accounts for measurement errors using a Kalman filter approach, although any suitable technique may be employed for the purpose of dealing with measurement errors, as described above. In this regard, any measurement error compensation technique that is adopted should be readily expandable to account for measurement errors in parameters that are measured in the context of techniques A-C including any modified or alternative forms of these techniques. As a first example, technique C is alternatively configurable for using measured yaw angle and to account for yaw orientation measurement error, as described above.

Moving up in hierarchy from technique C is technique A. This latter technique adds electromagnetic locating field measurements to the overall process, while accounting for flux measurement errors, but without utilizing measured yaw angle. Method B tops the hierarchy by further taking into account measured yaw orientation, including any measurement error therein.

Figure 5A:
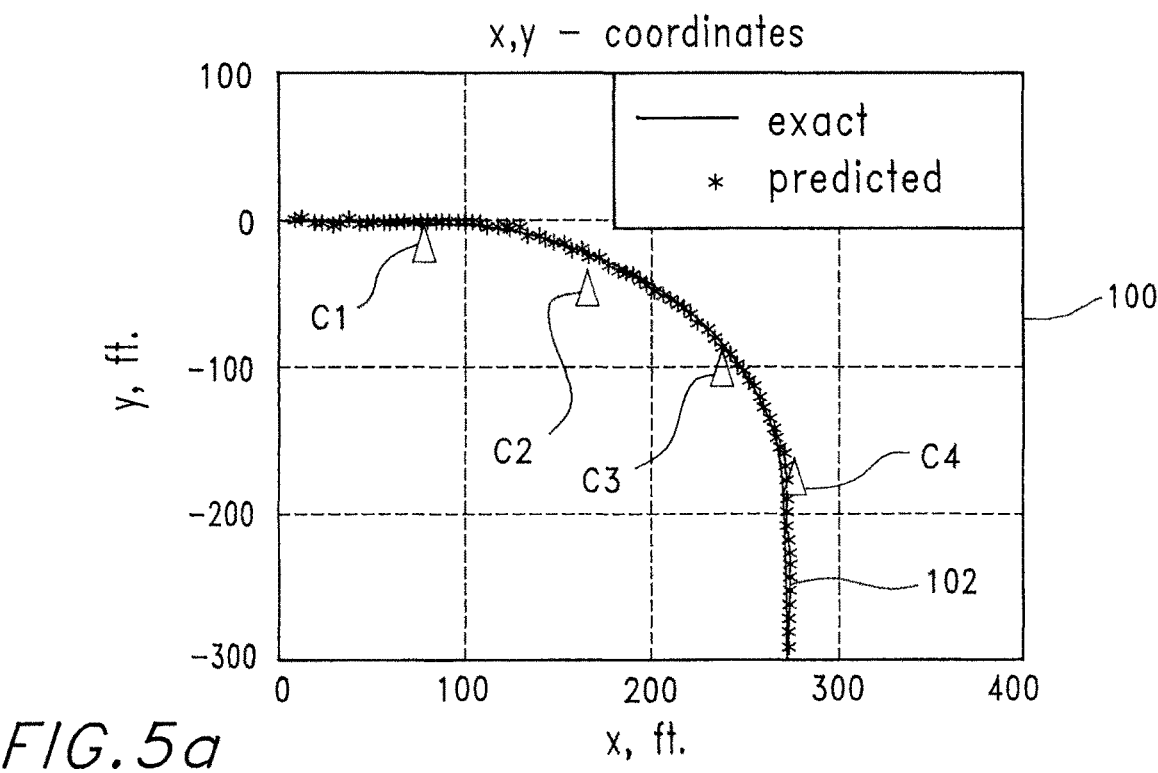
FIG. 5a is a diagrammatic plot, in the x-y plane, of an assumed drill path and above ground receivers that are positioned proximate thereto for use in a simulation for purposes of validation of technique A, wherein predicted positions of the boring tool are shown as "+" symbols proximate to the solid line of the assumed path.

Having described techniques A-D in detail above, numerical simulations using techniques A and D will now be described. In this regard, attention is immediately directed to FIGS. 5a-d wherein FIG. 5a shows a drilling region 100, in plan view using an x,y coordinate system, having four cones C1, C2, C3 and C4 located at the illustrated triangular shaped symbols. Table 2 gives x and y coordinates for each of the cones.

TABLE 2

(see FIG. 5a)

| Cone number | x coordinate (ft) | y coordinate (ft) | z coordinate (ft) |
|---|---|---|---|
| 1 | 80 | −10 | 12 |
| 2 | 160 | −50 | 6 |
| 3 | 240 | −1 | 6 |
| 4 | 275 | −180 | 6 |

Figure 5B:
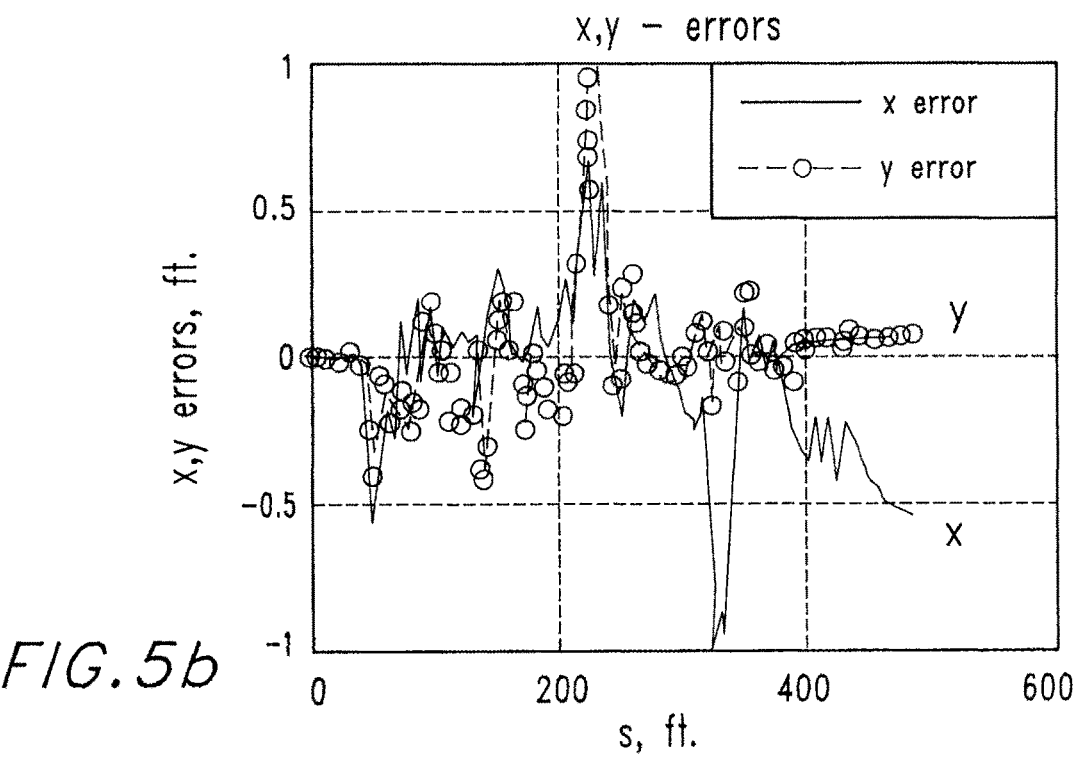
Figure 5C:
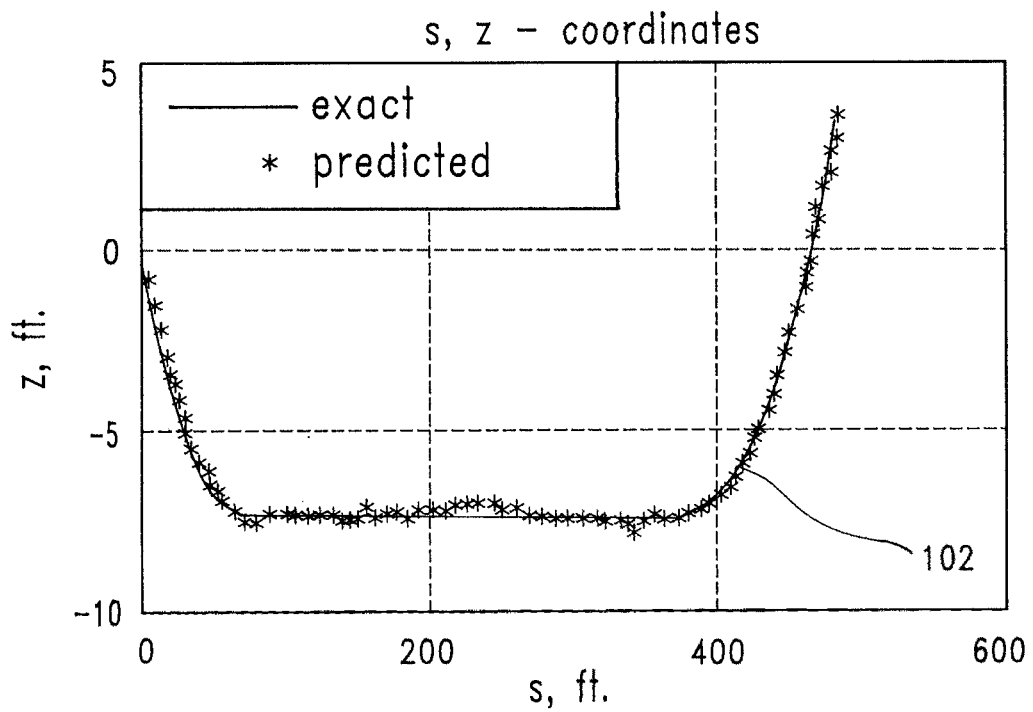
FIG. 5c shows a coordinate surface defined by the vertical, z axis and arc length s, illustrating further details of the assumed path of FIG. 5a including vertical movement of the boring tool on the assumed path.

A drill path 102, shown in FIGS. 5a and 5c, has been used to validate technique A. The plan view of FIG. 5a resembles a large quarter-circle extending nearly three hundred feet out and another three hundred feet to the right, as seen in the drilling direction of the figure at drill begin (i.e., from x=0, y=0). FIG. 5c is an elevational view of drill path 102 showing depth of the boring tool plotted against arc length s. The maximum depth of path 102 is about 7.5 ft below a horizontal plane passing through the origin of the global coordinate system. Exact position coordinates, pitch, yaw and rod bend radius are generated with a minimum rod bending radius of 200 ft and a set of steering/drilling parameters $\overline{\sin\theta}$, $\overline{\cos\theta}$ that were also used in tracking simulations.

Figure 5D:
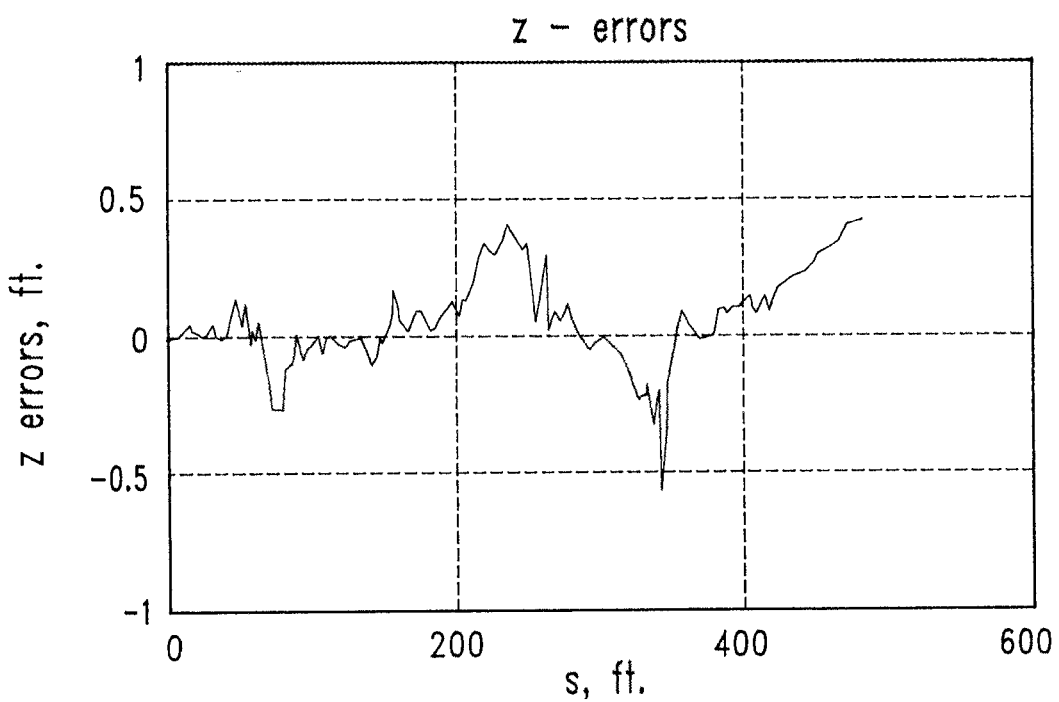
FIG. 5d is a plot of z axis error for the predicted data of FIG. 5c along arc length s.
Figure 5E:
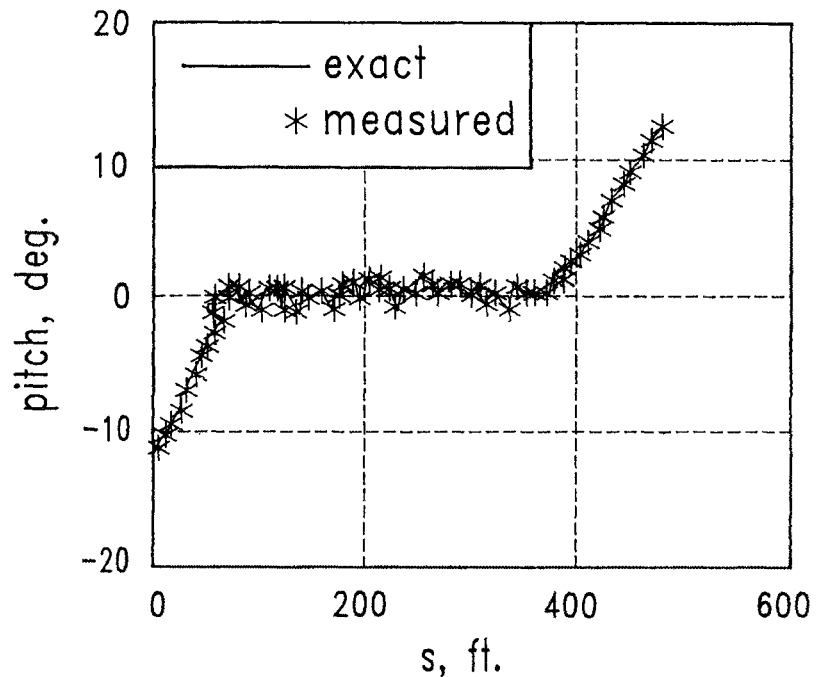
FIG. 5e is a plot of pitch against arc length s showing actual pitch orientation along the assumed path as well as "measured" or "synthesized" pitch values, exhibiting introduced measurement error, that are used in the technique A simulation.
Figure 5F:
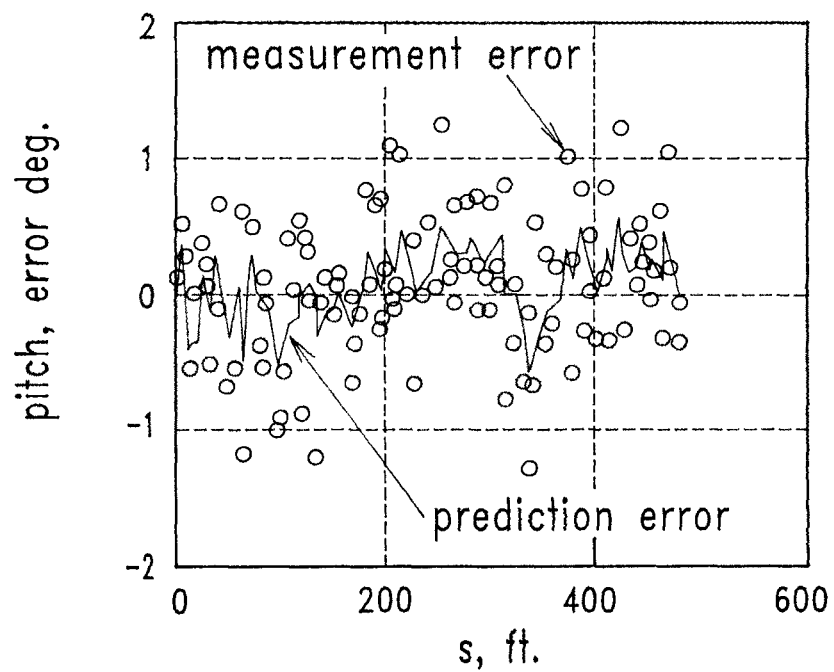
FIG. 5f is a plot of two types of pitch error against arc length s including introduced measurement error for synthesized pitch sensor readings taken by the boring tool along the assumed path where each pitch measurement error value is indicated as a circle and including a plot of prediction error in the pitch value along s as determined by technique A and influenced by the measurement error.
Figure 5G:
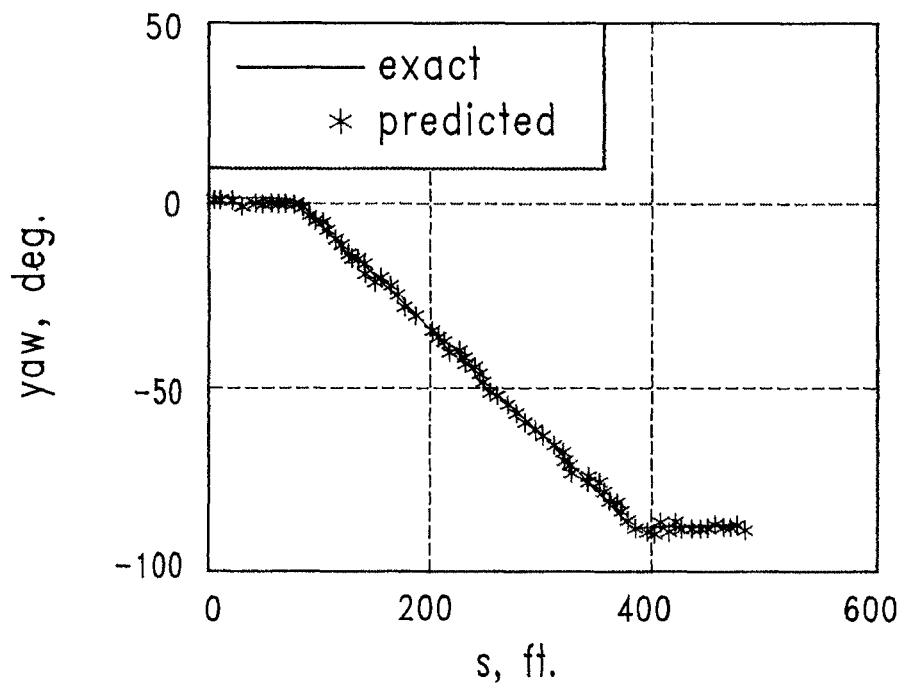
FIG. 5g shows exact yaw orientation of the assumed path, as a solid line, and predicted yaw orientations, shown as "+" symbols, plotted against arc length s wherein the predicted yaw values are produced by technique A.

It is noted that FIGS. 5a, 5c and 5g show predicted tracking data obtained from "measured" or "synthesized" transmitter pitch, as will be described below with reference to FIG. 5e, and from the fluxes measured at the four cones placed along the drill path, plotted against s and as the difference between predicted and exact coordinates, while corresponding FIGS. 5b, 5d, 5f and 5h show errors in the predicted data of interest. For example, FIG. 5a shows the predicted drill path in the xy plane as a series of "+", symbols while FIG. 5b shows a plot of x error as a solid line and a plot of y error as a broken line. Fluxes and pitch are "measured" at every four foot increment of rod length. These "measured" data were obtained by adding white noise with 1 sigma values of 0.5 deg to exact pitch and $2\times10^{-6}$ to exact fluxes per unit dipole strength, respectively.

FIG. 5c illustrates the exact z component of assumed drill path 102 as a solid line and shows the depth of predicted drill path points as a series of "+" symbols. Referring to FIG. 5d, vertical drill path position errors, corresponding to the predicted positions of FIG. 5c, are plotted against s.

Turning again to FIG. 5e, exact pitch of the assumed path is plotted against s as a solid line. A series of "+" signs indicates predicted pitch values in relation to the assumed path. In this regard, it should be appreciated that there are two types of pitch angle associated with the present type of analysis: 1) a measured pitch obtained from a pitch sensor forming part of the boring tool and (2) a predicted pitch that is one output of the Kalman filter. Consequently, there are also two types of pitch error shown in FIG. 5f: (1) a measurement error, corresponding to each pitch measurement and each of which is indicated by a circle symbol and (2) a prediction error plot which is shown as a solid line that is influenced by the introduced pitch measurement error.

Figure 5H:
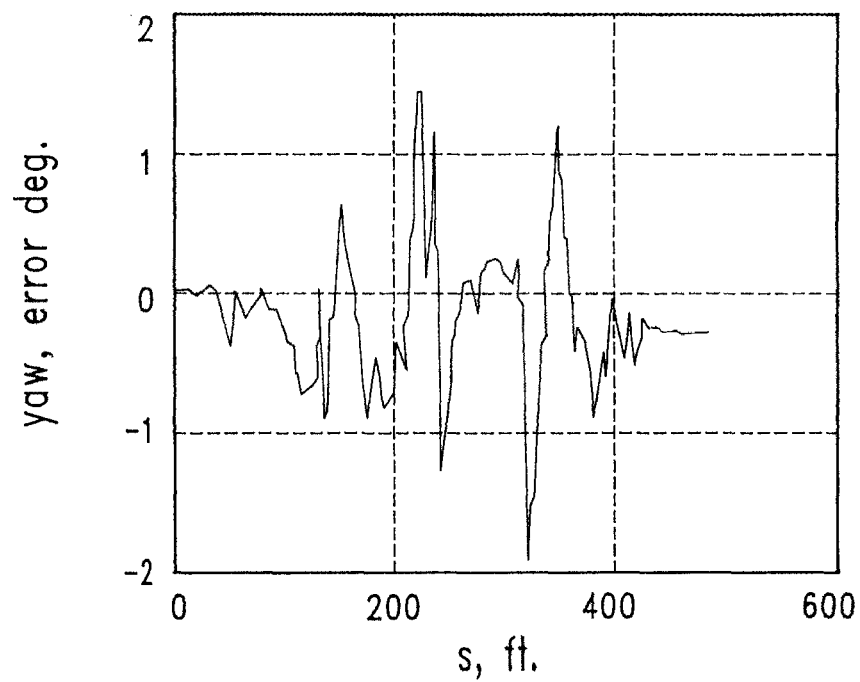
FIG. 5h shows yaw error plotted against s for the predicted yaw values of FIG. 5g.

FIG. 5g illustrates exact yaw for the assumed path plotted against s having predicted yaw values denoted by a series of "+" symbols. FIG. 5h illustrates a corresponding plot of yaw error, in degrees, against s.

Figure 6A:
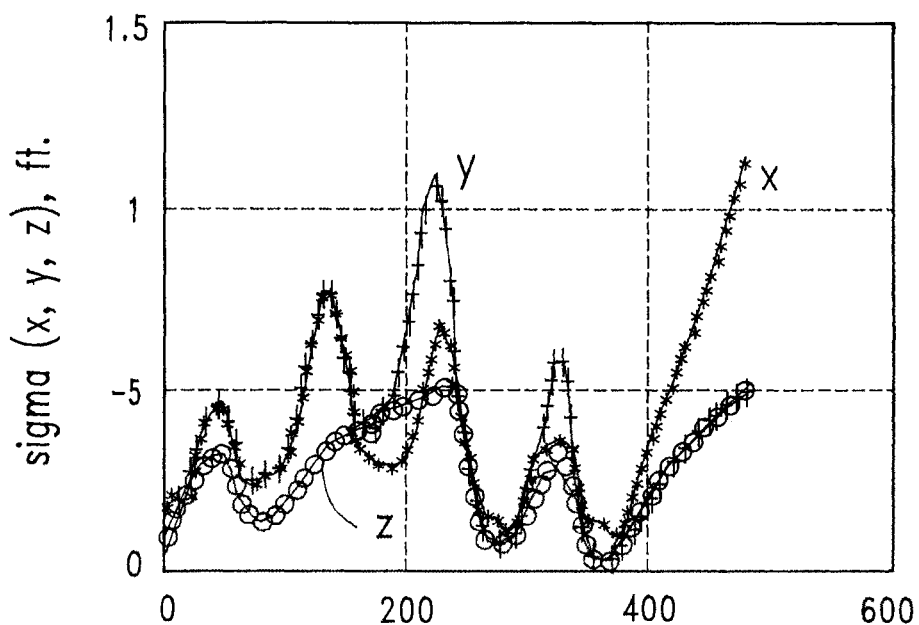
FIGS. 6a and 6b show error estimates for the assumed path defined as 1 standard deviation or 1 sigma, obtained from exact cone fluxes and pitch and representing errors in position coordinates (FIG. 6a), as well as pitch and yaw angles (FIG. 6b) that can be expected using measured fluxes and pitch as input for the tracking technique.
Figure 6B:
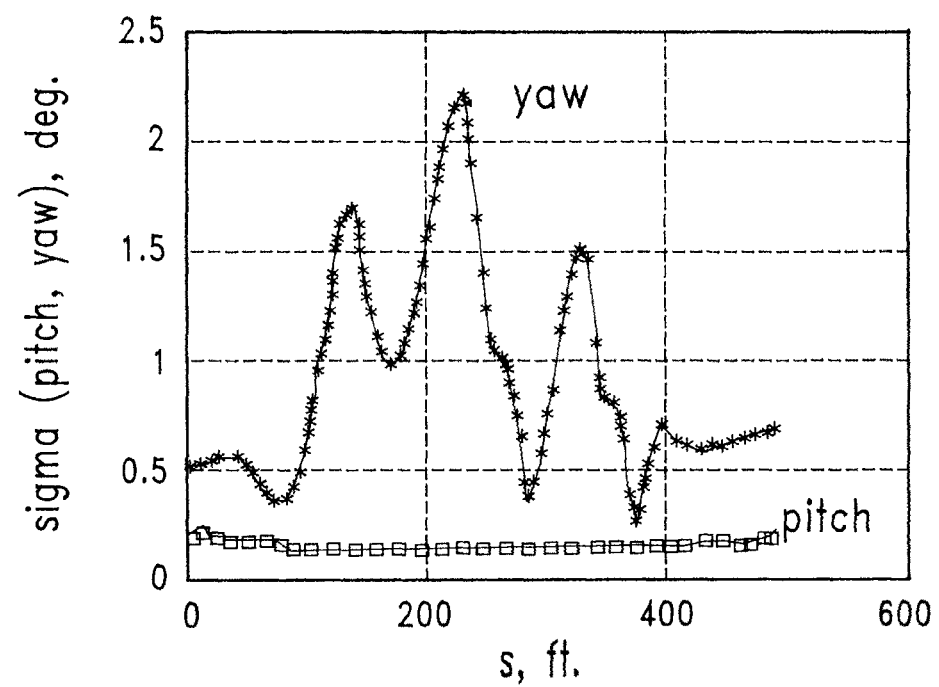

FIGS. 6a and 6b provide error estimates for drill path 102, defined as 1 standard deviation or 1 sigma, obtained from exact cone fluxes and pitch and representing errors in position coordinates (FIG. 6a), as well as pitch and yaw angles (FIG. 6b) that can be expected using measured fluxes and pitch, which are used as input for the present tracking technique simulation. Errors seen in tracking results of FIGS. 5b, 5d, 5f and 5h agree well with estimated errors shown in FIGS. 6a and 6b.

It should be emphasized that the purpose of the foregoing simulation is to demonstrate the remarkably powerful tracking capability of technique A. It is not intended to indicate what level of absolute drilling accuracy this method can provide. If needed, several expedients are available to even further improve the accuracy achieved in this example. These expedients include, for example, increasing transmitter signal strength to lower the noise level per unit dipole strength, the use of a transmitter with a more accurate pitch sensor, and/or the placement of additional cones along the drill path.

Figure 7A:
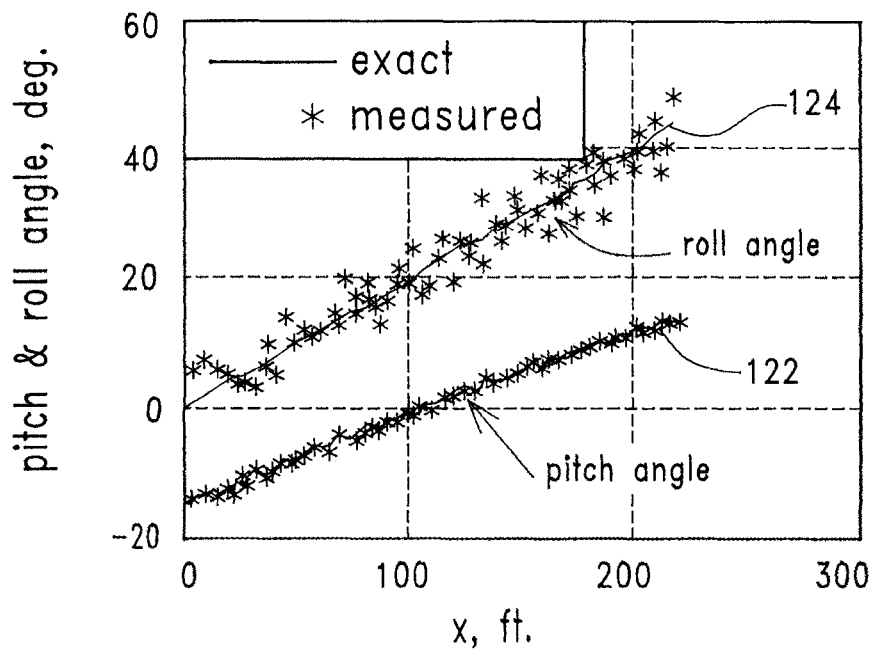
FIG. 7a illustrates pitch and yaw orientation along an assumed drill path, plotted as solid lines against the x axis, for use in a simulation which employs technique D of the present invention and which further illustrates synthesized "measured" pitch and roll values, that are used as input for the simulation.
Figure 7B:
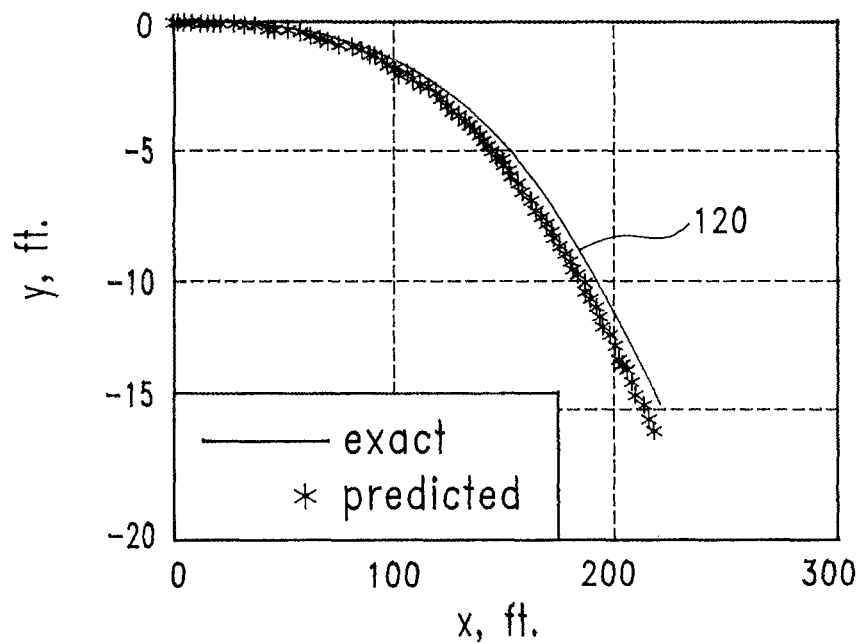
FIG. 7b is a plan view plot, in the x-y coordinate plane, of the assumed path of FIG. 7a, further showing technique D predicted x-y positions for the assumed path of the boring tool.
Figure 7C:
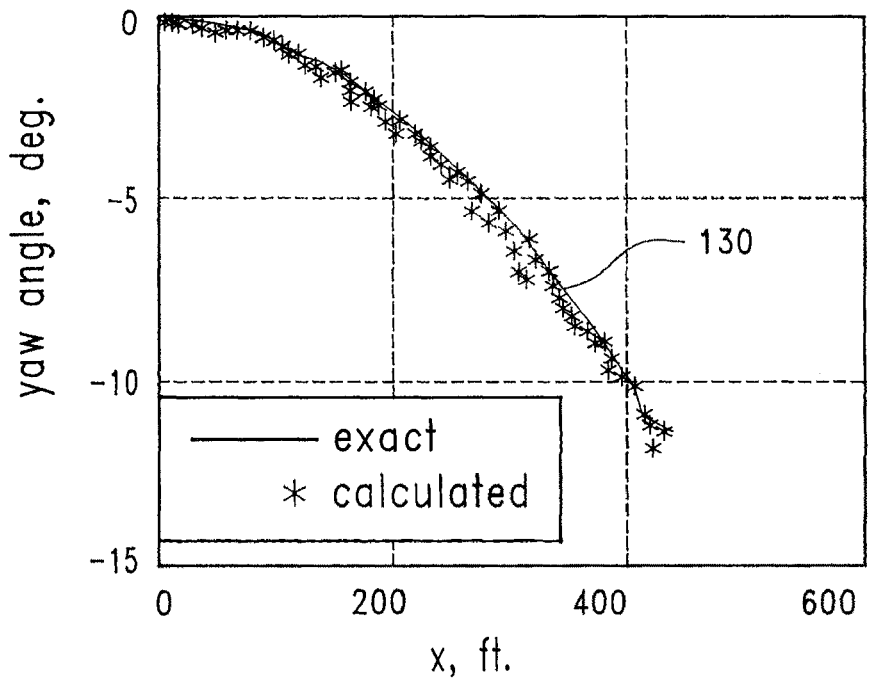
FIG. 7c is a plot of the yaw angle of the assumed path of FIGS. 7a and 7b against the x axis, further showing technique D calculated yaw values as "+" symbols.
Figure 7D:
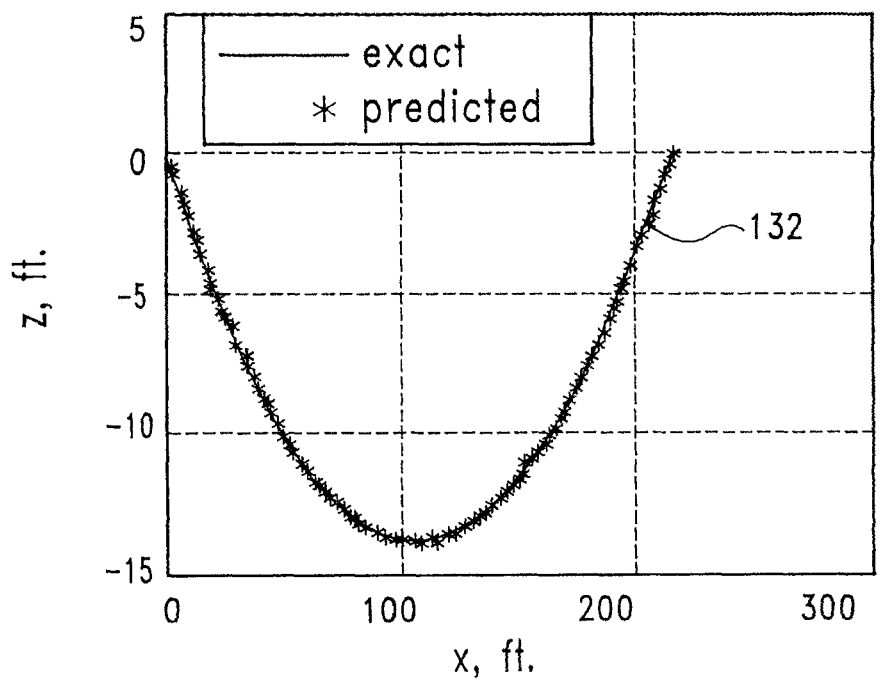
FIG. 7d is a plot of boring tool depth in the x-z coordinate plane showing the depth of the assumed path of FIGS. 7a and 7b as well as technique D predicted depth values which are indicated as "+" symbols.

Attention is now directed to FIGS. 7a-7d for purposes of describing a numerical simulation of technique D. FIG. 7a illustrates "measured" pitch and roll angles as generated for an assumed drill path 120 that is shown in FIGS. 7b and 7d and plotted in the xy plane and xz plane, respectively. Corresponding assumed pitch 122 and assumed roll angle 124 are shown in FIG. 7a and plotted against the x axis. Thus, for the assumed drill path, exact pitch and roll angles, as well as exact position coordinates are known. Predicted values for yaw angle and xyz coordinate positions are shown using a "+" symbol in proximity to each plot in FIGS. 7b, 7c, 7d.

Turning to FIG. 7a, "measured" angles are obtained by adding white noise to the exact values with a 1 standard deviation error of 0.5 degrees for pitch and 3 degrees for roll, respectively. FIG. 7c shows yaw angles predicted with equation 33 plotted against x. The exact yaw angle for the assumed path is shown by a solid line indicated by reference number 130 while calculated positions are shown as "+" symbols proximate to the exact yaw plot. FIG. 7d also uses "+" symbols to indicate predicted coordinates in the xz plane, also showing a solid line plot 132 of exact z axis depth against the x axis in relation to the predicted z axis depths. It is readily evident, as seen in FIGS. 7a through 7d, that the drill path predicted with "measured" pitch and roll and calculated yaw, as input, follows the known exact drill path. Thus, tracking accuracy may be acceptable for some tracking tasks over a distance of 100 feet or so, especially in light of the large assumed roll angle measurement error used in this simulation. It is worthwhile to notice that the predicted drill path does not reflect the random variations of the "measured" input data due to the smoothing effect of numerical integration. It is submitted that the accuracy which is provided by technique D, using only roll and pitch measurements, has not been attained by the prior art.

Figure 8:
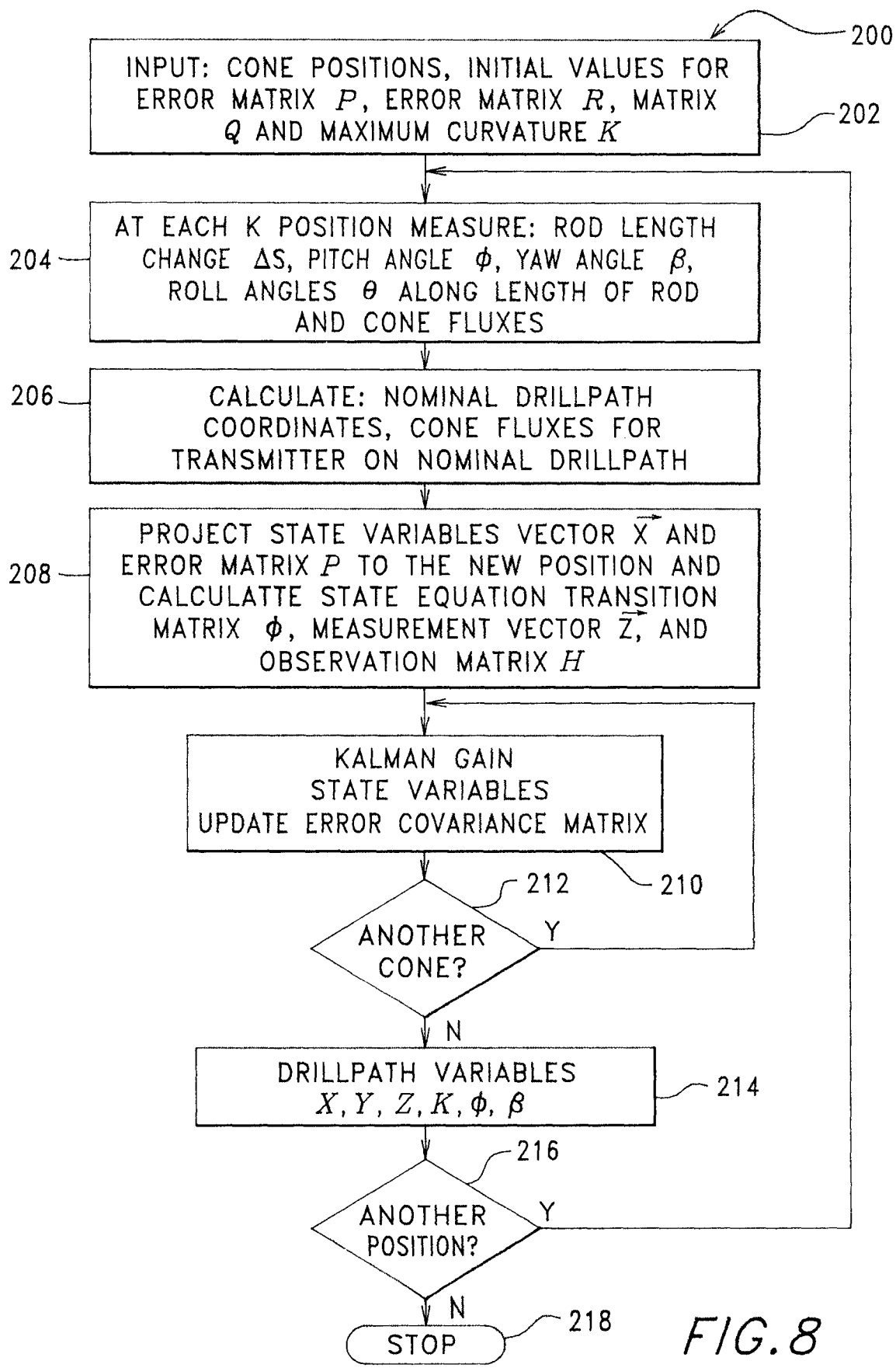
FIG. 8 is a flow diagram of technique B illustrating a step-by-step solution of drillpath variables.

Turning to FIG. 8, a flow diagram, generally indicated by the reference number 200, illustrates the steps which form technique B and which subsumes the steps of all described techniques. In step 202, initial values of error covariance matrix and maximum curvature are specified. In addition, cone position coordinates are input as well as empirical data for the observation covariance matrix and the discrete process noise covariance matrix. In step 204, for each position k on the drillpath, drillpath variables comprising nominal drillpath position coordinates, curvature, pitch and yaw, are measured wherein a series of yaw measurements are used as taken along Δs. In step 206, nominal drill path coordinates are calculated along with cone fluxes for the transmitter on the nominal drill path. In step 208, the state variables vector $\vec{x}$ and error matrix P are projected to the new or next k position. State equation matrix Φ, measurement vector $\vec{z}$ and observation matrix H are calculated. The Kalman filter is executed in step 210 for each cone at one k position of the drillhead. Step 212 determines if the Kalman filter loop need be repeated with data from an additional cone and, if so, step 210 is repeated. In this regard, the imbedded Kalman filter loop is entered separately for each cone. Otherwise, execution passes to step 214 wherein drillpath variables are determined. Step 216 determines if the process is to be repeated for a next one of the k positions so as to repeat the process beginning with step 204. Upon completion of the final k position, stop step 218 is entered.

Inasmuch as the techniques and associated method disclosed herein may be provided in a variety of different configurations and modified in an unlimited number of different ways, it should be understood that the present invention may be embodied in many other specific forms without departing from the spirit or scope of the invention. Therefore, the present examples and methods are to be considered as illustrative and not restrictive, and the invention is not to be limited to the details given herein, but may be modified within the scope of the appended claims.

What is claimed is:

1. In a system for tracking a boring tool which is moved in an underground region using a drill string having a length that extends to the boring tool and said boring tool having an orientation that is characterized by a pitch orientation, a roll orientation and a yaw orientation, and which is steerable underground in the underground region using said roll orientation, said boring tool being configured for advancing in a straight ahead mode during a continuous roll applied by said drill string and further being configured for advancing in a steering mode by moving the boring tool at a fixed roll orientation applied by said drill string to produce a maximum curvature in said drill string, an apparatus comprising:

an arrangement for measuring an advance of the boring tool over a path segment from a known, start position to an end position, where the path segment forms a portion of an overall drill path that is taken by the boring tool and includes a segment length;

a pitch sensor for measuring the pitch orientation and a roll sensor for measuring the roll orientation;

a processor for establishing a resulting position of the boring tool at an endpoint of said path segment based on the measured pitch orientation, the measured roll orientation, the advance of the drill string and the maximum curvature of the drill string.

2. The apparatus of claim 1 wherein a pitch value is measured by the pitch sensor during a concluding portion of the path segment and that pitch value is used by said processor in said establishing the resulting position.

3. The apparatus of claim 1 wherein said drill string is made up of a series of drill rods, each of which includes a drill rod length, and said processor is configured to use said path segment to match said drill rod length and a pitch value that is measured during a concluding portion of the path segment as the path segment pitch orientation.

4. The apparatus of claim 1 wherein said drill string is made up of a series of drill rods each of which includes a drill rod length and wherein said path segment is selected to match said drill rod length and corresponds to a particular one of said drill rods.

5. The apparatus of claim 1 wherein said processor is configured to integrate certain values including the pitch orientation and the yaw orientation to track a drilling path of the boring tool in said region.

6. The apparatus of claim 1 wherein the processor is configured to determine an averaged roll characteristic responsive to movement of the boring tool along the path segment through which the boring tool is advanced in said region using at least one of the straight ahead mode and the steering mode and for determining a path segment pitch orientation based on at least one measured pitch orientation of said boring tool along said path segment and for establishing the resulting position of the boring tool based on the averaged roll characteristic along with the measured pitch orientation, the measured advance of the drill string and the maximum drill string curvature.

7. The apparatus of claim 6 wherein the processor is configured to determine the yaw orientation of the boring tool at the resulting position based on the averaged roll characteristic and the path segment pitch orientation.

8. The apparatus of claim 6 wherein the boring tool is advanced over said path segment using a combination of the straight ahead mode and the steering mode and the processor is configured to determine the averaged roll characteristic and the path segment pitch orientation based on the combination of steering modes.

9. The apparatus of claim 6 wherein the processor is configured to produce a series of incremental roll positions along the path segment based on the measured roll orientation for use in establishing an incremental change in the pitch orientation and an incremental change in the yaw orientation of the boring tool over the path segment for tracking the boring tool over the path segment.

10. The apparatus of claim 9 wherein the processor is configured to determine a set of data relating to the series of incremental roll positions of the boring tool at a corresponding series of positions that are spaced across said path segment, separated by an at least generally equal distance increment, as the boring tool advances through the path segment and to use the maximum curvature of said drill string in said region that is associated with a fixed roll orientation of the boring tool in said steering mode along with the set of data to establish the incremental change in the pitch orientation and the incremental change in the yaw orientation for the current path segment.

* * * * *